(12) United States Patent
Johnson et al.

(10) Patent No.: US 7,350,085 B2
(45) Date of Patent: Mar. 25, 2008

(54) TAMPER RESISTANT SOFTWARE-MASS DATA ENCODING

(75) Inventors: Harold J. Johnson, Nepean (CA); Stanley T. Chow, Nepean (CA); Yuan X. Gu, Kanata (CA)

(73) Assignee: Cloakware Corporation, Kanata, Ontario (CA)

( * ) Notice: Subject to any disclaimer, the term of this patent is extended or adjusted under 35 U.S.C. 154(b) by 778 days.

(21) Appl. No.: 10/257,333

(22) PCT Filed: Apr. 12, 2001

(86) PCT No.: PCT/CA01/00493

§ 371 (c)(1),
(2), (4) Date: Feb. 28, 2003

(87) PCT Pub. No.: WO01/79969

PCT Pub. Date: Oct. 25, 2001

(65) Prior Publication Data

US 2003/0163718 A1    Aug. 28, 2003

(30) Foreign Application Priority Data

Apr. 12, 2000 (CA) .................................. 2305078

(51) Int. Cl.
  *G06F 12/14* (2006.01)
  *G06F 9/355189* (2006.01)
(52) U.S. Cl. .................. 713/193; 713/189; 713/190; 713/194; 713/165; 713/155; 711/202; 711/203; 711/216
(58) Field of Classification Search ............... 711/216
See application file for complete search history.

(56) References Cited

U.S. PATENT DOCUMENTS 4,064,558 A * 12/1977 Hughes et al. .............. 711/207
4,135,240 A *  1/1979 Ritchie ....................... 711/164
4,215,402 A *  7/1980 Mitchell et al. ............ 711/216

(Continued)

FOREIGN PATENT DOCUMENTS

EP    0908810    4/1999

(Continued)

OTHER PUBLICATIONS

IBM Corp., "Data Security Method for Storage Device", *IBM Technical Disclosure Bulletin*, (May 1995), vol. 38, No. 5, p. 23, Armonk, NY, USA.

(Continued)

*Primary Examiner*—Ayaz Sheikh
*Assistant Examiner*—Saoussen Besrour
(74) *Attorney, Agent, or Firm*—Lynn S. Cassan

(57) ABSTRACT

Mass data (the contents of arrays, large data structures, linked data structures and similar data structures stored in memory) are common targets for attack. The invention presents a method and system of protecting mass data by mapping virtual addresses onto randomly or pseudo-randomly selected actual addresses. This mapping distributes data values throughout the memory so an attacker cannot locate the data he is seeking, or identify patterns which might allow him to obtain information about his target (such as how the software operates, encryption keys, biometric data or passwords stored therein, or algorithms it uses). Additional layers of protection are described, as well as efficient techniques for generating the necessary transforms to perform the invention.

12 Claims, 9 Drawing Sheets

U.S. PATENT DOCUMENTS

| | | | | |
|---|---|---|---|---|
| 4,812,981 | A * | 3/1989 | Chan et al. | 711/202 |
| 5,081,675 | A * | 1/1992 | Kittirutsunetorn | 713/190 |
| 5,095,525 | A * | 3/1992 | Almgren et al. | 711/202 |
| 5,123,045 | A * | 6/1992 | Ostrovsky et al. | 713/190 |
| 5,129,074 | A * | 7/1992 | Kikuchi et al. | 711/173 |
| 5,530,958 | A * | 6/1996 | Agarwal et al. | 711/3 |
| 5,899,994 | A * | 5/1999 | Mohamed et al. | 707/100 |
| 6,115,802 | A * | 9/2000 | Tock et al. | 711/216 |
| 6,167,392 | A * | 12/2000 | Ostrovsky et al. | 707/2 |
| 6,192,475 | B1 * | 2/2001 | Wallace | 713/190 |
| 6,779,114 | B1 * | 8/2004 | Chow et al. | 713/189 |
| 7,003,673 | B1 * | 2/2006 | Diener et al. | 713/190 |

FOREIGN PATENT DOCUMENTS

| | | |
|---|---|---|
| WO | WO 99/01815 | 1/1999 |
| WO | WO 01/79969 | 10/2001 |

OTHER PUBLICATIONS

Hewlett Packard website, "IA-64 Instruction Set Architecture Guide IA-64 Addressing and Protection, Section 7.1 Virtual Addressing", found at www.devresource.hprce/docs/refs/IA641SA/addr_protect2.html, pp. 1-28, no date.

Peter J. Cameron, "Axioms For Polar Spaces", Chapter 7 from "Projective and Polar Spaces", found at www.maths.qmw.ac.uk/~pjc/pps, Sep. 14, 2002, pp. 97-114.

Course notes, "Math 551-Algebra-Fall 2000", found at www.math.rutgers.edu/courses/551/551-F00/groups1.pdf, fall, 2000, pp. 1-8.

Frank W. Miller, "Simple Memory Protection For Embedded & Real-Time Operating System Kernels", 9 pages, no date.

Bruce Jacob et al., "Virtual Memory: Issues of Implementation", IEEE Computer Magazine, Jun. 1998, pp. 33-43, Jun. 1998.

Oded Goldreich, "Towards a Theory of Software Protection and Simulation by Oblivious RAMs," Computer Science Department, published ACM, 1987, pp. 182-194.

C. Severance et al.,, "Distributed Linear Hashing and Parallel Projection in Main Memory Databases," 16th BLDB Conference, Brisbane, Australia, 1990, pp. 674-682.

Oded Goldreich et al., "Software Protection and Simulation on Oblivious RAMs", published in ACM, 1996, pp. 431-473.

"Topic 16-Virtual Addressing" CA 452 Principles of Operating Systems, no date.

Bennett et al; Predictable and Efficient Virtual Addressing for Safety-Critical Real-Time Systems; pp. 1-8, York, UK, no date.

Miller; Simple Memory Protection for Embedded & Real-Time Operating System Kernels; pp. 1-9, Baltimore, US, no date.

Jacob et al; Virtual Memory; Issues of Implementation; IEEE, Jun. 1998, pp. 33-43, US.

Goldreich; Towards a Theory of Software Protection and Stimulation of Oblivious RAM; Commputer Science Department; 1987, pp. 182, Israel.

Severance et al; Distributed Linnear Hashing and Parallel Projection in Main Memory Databases; 16th VLDB Conference, 1990, pp. 674-682, Australia.

Goldreich; Software and Simulation on Oblivious RAMs; Journal of ACM, vol. 43, No. 3, May 1996, pp. 431-473.

* cited by examiner

TAMPER RESISTANT SOFTWARE-MASS DATA ENCODING

The present invention relates generally to computer software, and more specifically, to a method and system of making computer software resistant to tampering and reverse-engineering.

BACKGROUND OF THE INVENTION

Keeping information hidden from hostile parties is essential in many contexts, including business, government, or the military. However, such organizations are relying more and more on the increased efficiencies provided by powerful computers and computer networks, which leaves their information resources vulnerable to theft and tampering attacks.

One particular target of such attacks is the information stored in various mass data forms. Mass data refers to the contents of arrays, large data structures, linked data structures, and data structures and arrays stored in memory allocated at run-time via calls to allocation facilities such as the C™ language standard utility function malloc( ). Mass data also refers to data stored in mass storage devices other than main memory, such as file data stored on rotating media such as hard disks, floppy disks, or magnetic drums, and streaming media such as magnetic tape drives, as well as other forms of mass storage such as CD-ROMs, EEPROMs (electrically erasable programmable read only memories) and other kinds of PROMs (programmable read only memories), and magnetic bubble memories. Other forms of mass storage media will be clear to those skilled in the art.

Much information about the purpose, intent, and manner of operation of a computer program can be obtained by observation of its mass data (arrays, data structures, linked structures with pointers, and files). Moreover, mass data is particularly vulnerable to tampering. The nature of the data and of typical programs makes thorough checking of the data for tampering impractical, so mass data is a common point of attack both for finding information about a program and for changing its behaviour. For example, many programs contain tables of information governing their behaviour, or access files which provide such tables.

As well, it is critical that certain data, such as biometric data, not be accessible to an attacker. A given user only has a finite number of biometric references such as a voice print, thumb print, retina print, signature ballistics via the mouse, and the like. Once these data are compromised, they are never again secure.

There are basically two ways to protect information: by means of physical security, and by means of obscurity.

Physical security keeps information from hostile parties by making it difficult to access. This can be achieved by restricting the information to a very small set of secret holders (as with passwords, biometric identification or smart cards, for example), by use of security guards, locked rooms or other facilities as repositories of the secrets, by 'firewall' systems in computer networks, and the like.

The weaknesses of physical security techniques are well known in the art. Passwords and other secrets can be lost or forgotten, thus, it is necessary to provide password recovery systems. These recovery systems are usually provided in the form of a human being who simply provides a new password to a user. The provision of passwords under human control presents many opportunities for the attacker.

Passwords which are complex enough to be secure from simple guessing or a "dictionary attack" (where an attacker simply makes successive access attempts using all words and combinations of words in a dictionary) are usually stored electronically, thus they could be discovered by an attacker. Locked rooms and firewall systems cannot be perfectly secure, and present themselves as high value targets for attack; breaking through a firewall usually gives an attacker access to a great quantity of secure material.

Another proposed method of protecting of mass data is to encode password and encryption systems into microprocessors, so that the microprocessors communicate with external memory, for example, using data in an encrypted form. While such a system offers some physical protection, it cannot implemented on the microprocessors currently used on computers and communication devices as it requires a physical change to the architecture of the microprocessor. Clearly this is an impractical solution in view of the vastness of the existing computer infrastructure.

The other approach is protection by obscurity, that is, by making discovery of the secret information improbable, even if a hostile party can access the information physically.

For example, in cryptography, messages are concealed from attackers by encoding them in unobvious ways. The decoding function is concealed in the form of a key, which is generally protected by physical means. Without knowledge of the key, finding the decoding function among all of the various possibilities is generally infeasible.

In steganography, secret messages are buried in larger bodies of irrelevant information. For example, a secret text message might be concealed in the encoding of a video stream or still image. Steganography is effective because the exact information in the video stream can vary slightly without any significant effect being detectible by a human viewer, and without any noticeable stream-tampering being visible to a hostile party. Again, there is a dependence on a key to indicate the manner in which the information is encoded in the video stream, and this key must be protected by physical security.

In an attempt to protect information embodied in computer programs, several approaches have been used.

For example, it is common within a corporate LAN to protect 3rd-party proprietary software tools by embedding licenses and license-processing in them. The license-processing checks the embedded license information by contacting a license server for validation. This approach is not generally viable outside such relatively safe environments (such as corporate Intranets), because the license-processing is vulnerable to disablement. An attacker need only reverse engineer the software to locate the line of software code that tests whether an access attempt should be allowed, and alter this line to allow all access attempts.

Software and data to be protected can be encrypted, and then decrypted for execution. This approach is quite vulnerable (and has resulted in security breaches in practice) because the software and data must be decrypted in order to execute. With appropriate tools, an attacker can simply access this decrypted image in virtual memory, thereby obtaining a 'plain-text' of the program.

Finally, software and data can be encoded in ways which make understanding it, and thereby extracting the information concealed within it, more difficult. For example, one can simply apply techniques which are contrary to the design principles of good software engineering: replacing mnemonic names with meaningless ones, adding spurious, useless code, and the like. These techniques do not provide a rigorous solution to the problem though. A patient observer will ultimately determine how the code is operating using tools which allow the attacker to access and analyse the state of the running program.

There is therefore a need for a system and method which secures mass data from tampering and reverse engineering.

SUMMARY OF THE INVENTION

It is therefore an object of the invention to provide a novel method and system of making computer software resistant to tampering and reverse-engineering which obviates or mitigates at least one of the disadvantages of the prior art.

One aspect of the invention is broadly defined as a method of obscuring memory contents comprising the steps of: responding to a request to store a data value at a virtual address by: mapping the virtual address onto a randomly selected actual address; and storing the data value in a memory location indexed by the actual address.

Another broad aspect of the invention is defined as a method of memory retrieval which is tamper-resistant and obscure comprising the steps of: responding to a request to fetch a data value from a virtual address by: calculating a hash of the virtual address to generate an actual address; and fetching the data value from a memory location indexed by the actual address.

Another aspect of the invention is defined as system for obscuring memory contents comprising: a computer; the computer being operable to: respond to a request to store a data value at a virtual address by: mapping the virtual address onto a randomly selected actual address; and storing the data value in a memory location indexed by the actual address.

Another aspect of the invention is defined as an apparatus for obscuring memory contents comprising: means for responding to a request to store a data value at a virtual address by: mapping the virtual address onto a randomly selected actual address; and storing the data value in a memory location indexed by the actual address.

An additional aspect of the invention is defined as a computer readable memory medium for storing software code executable to perform the method steps of: responding to a request to store a data value at a virtual address by: mapping the virtual address onto a randomly selected actual address; and storing the data value in a memory location indexed by the actual address.

A further aspect of the invention is defined as a carrier signal incorporating software code executable to perform the method steps of: responding to a request to store a data value at a virtual address by: mapping the virtual address onto a randomly selected actual address; and storing the data value in a memory location indexed by the actual address.

BRIEF DESCRIPTION OF THE DRAWINGS

These and other features of the invention will become more apparent from the following description in which reference is made to the appended drawings in which:

FIGS. 3-6 use a common presentation format. Specifically:

- rectangles represent data storage locations, with wide, thin rectangles used to represent arrays. For example, in FIGS. 3-4, the SVMA cell arrays are shown as wide, thin rectangles. The "0" and "N-1" labels under the left and right ends of these rectangles indicate the limits of the index ranges for the arrays;
- smaller rectangles represent storage for individual pieces of data rather than for arrays. For example, in FIGS. 3-4, the address a and the datum x transferred to, or from, memory are individual pieces of data, the small rectangles indicating registers used to hold them;
- a small rectangle within an array, represents a single element within that array;
- an arrow with no black circle indicates data flow. For example, in FIG. 3, a piece of data, x, flows from an individual piece of storage to an SVMA element (namely, element a of an SVMA);
- an arrow interrupted by a black circle, indicates a selection operation. For example, in FIG. 3, the address, a, selects element a of the array of SVMA cells; and
- boxes with rounded edges represent operations. For example, in FIG. 5, the round-edged box identified with a W is used to indicate that the writing data transformation W is performed.

DESCRIPTION OF THE INVENTION

Figure 1:
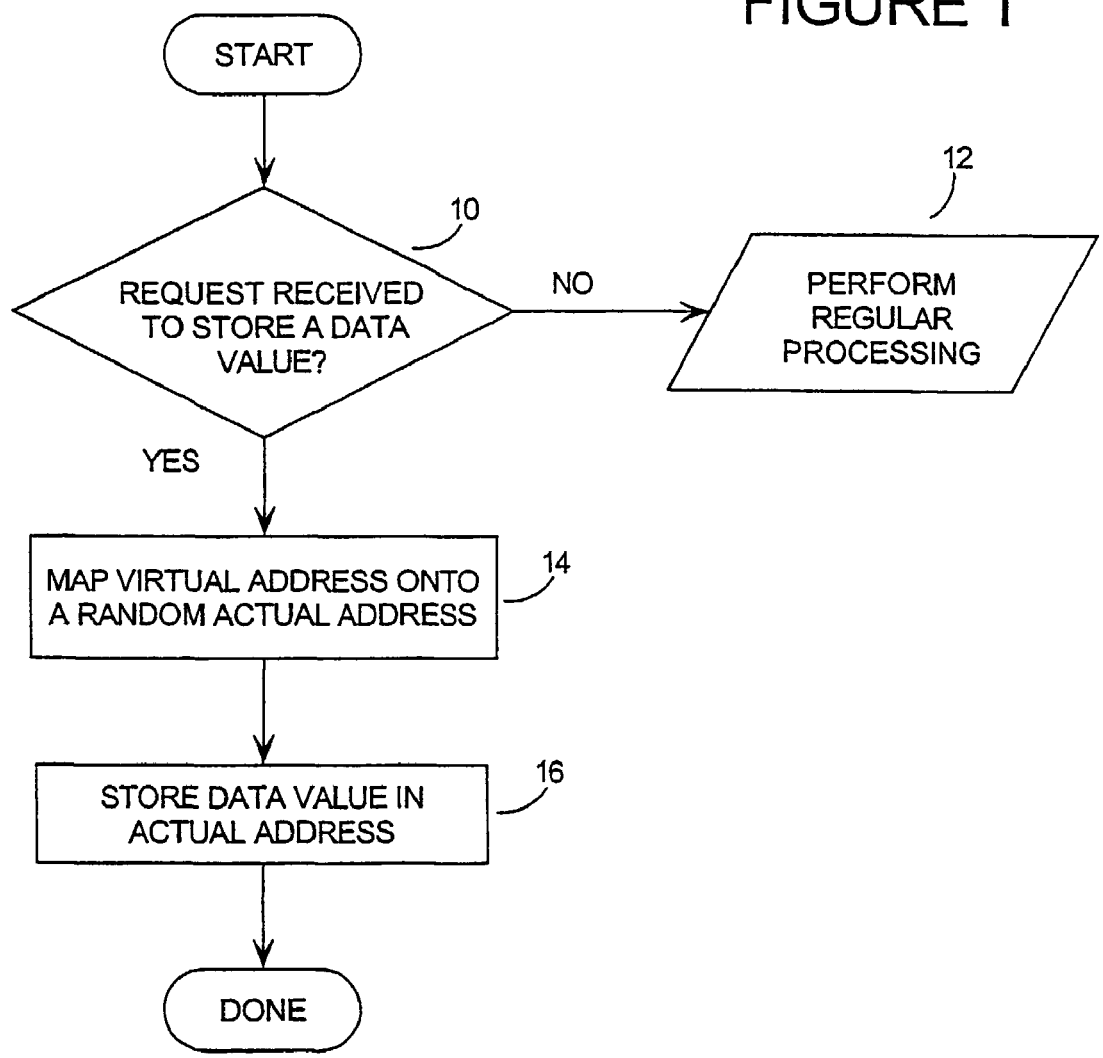
FIG. 1 presents a flow chart of a storage routine in a broad embodiment of the invention.

A method which addresses the objects outlined above, is presented in the flow chart of FIG. 1. In its broadest form, the invention relies on the random or pseudo-random dispersion of data being stored, throughout the available memory or an area of the available memory. As will be explained in greater detail, this dispersion makes it very difficult for an attacker to locate certain pieces of data he is searching for, and also distributes the data values with respect to one another. Thus, data are not stored in areas of the memory one might expect them to be, and there are no clearly identifiable blocks or patterns of data in the memory.

This technique could be enabled in a software routine as presented in FIG. 1. The routine beings at step 10, by determining whether an input command corresponds to a request to store a data value at a virtual address. If not, regular processing of the input command is performed at step 12. If the input command does correspond with a request to store a data value, control passes to step 14, where the virtual address is mapped onto a randomly selected actual address.

This mapping may be done in a truly random manner, but will generally be done in a pseudo-random manner, because truly random numbers cannot be generated in pure software. A desirable technique for generating pseudo-random address is by use of a hash function, which generates what appears to be a random number from a given input. In the formal sense, the definition of a hash function is somewhat more restrictive, but it is clear in this case that any function may be employed which maps a given input onto a random or pseudo-random output.

As this routine would be implemented as an addition to an existing software program, the request to store the data value will result in the assignment of a storage address as part of the original program. The data value is then stored in the actual memory location identified by the hash value, at step 16.

The routine presented in FIG. 1 would generally be implemented as part of a larger software program which would include functionality to receive input commands from users, and execute statements from running software programs. As well, the storage step 16, would typically be implemented by an operating system's virtual memory, which would perform the actual tasks of identifying the storage location and storing the data. This virtual memory is typically implemented in a combination of hardware and software, where most operations are handled at high speed in hardware, but occasional operating system software intervention occurs (for example, to load needed areas of memory from secondary storage devices). These kinds of hardware-based virtual storage systems are well known in the art.

Implementing the invention in such an environment would be within the ability of one skilled in the art, and the details of doing so would vary from platform to platform. It would also be clear to one skilled in the art that the hash function of step 14 would generally be constructed to receive the required range of input values and provide an output range which lies within the memory space available to the program.

Figure 2:
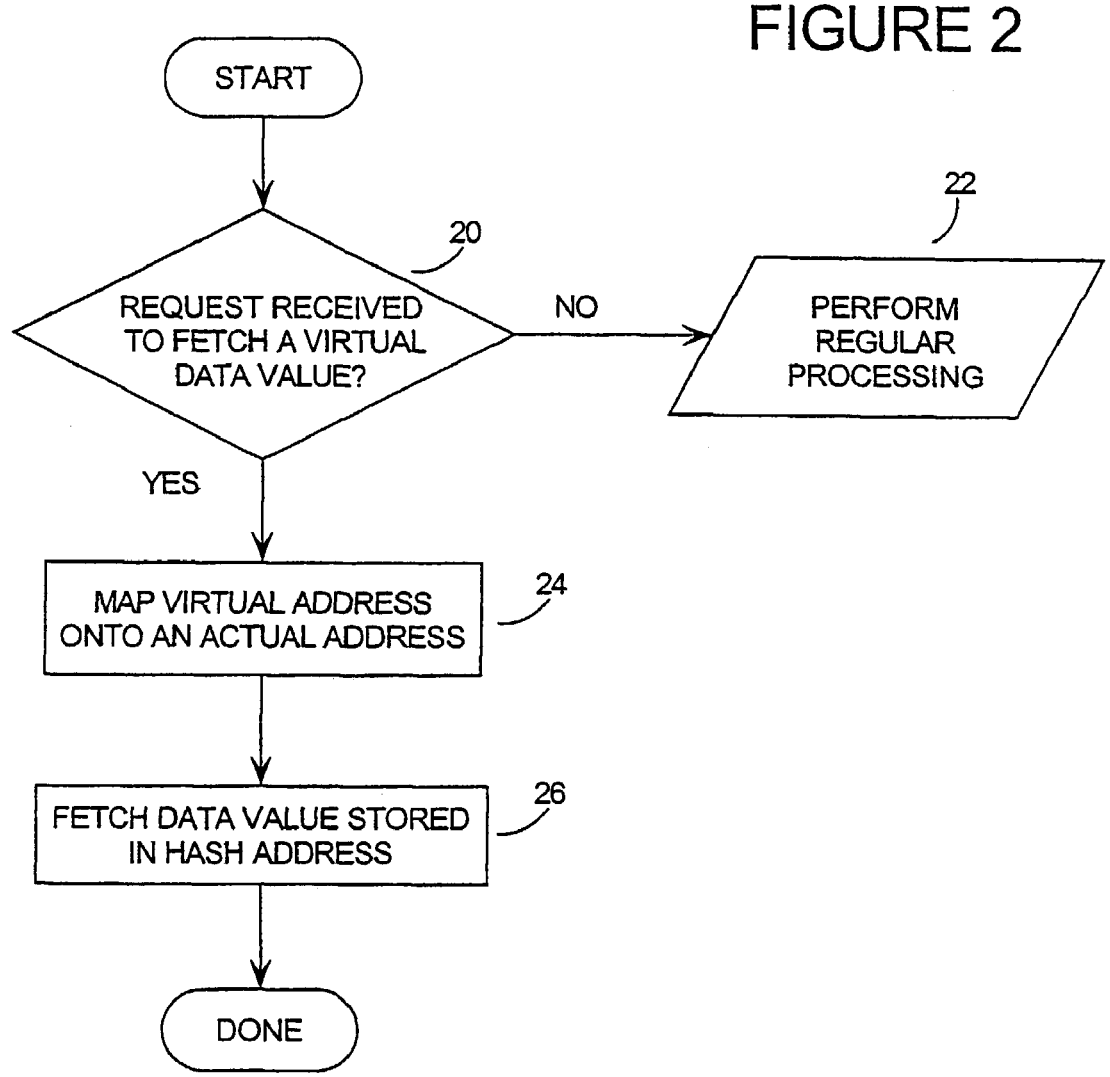
FIG. 2 presents a flow chart of a fetching routine in a broad embodiment of the invention.

While FIG. 1 presents a method of storage to memory, the complementary retrieval routine is presented in the flow chart of FIG. 2. Again, the routine is presented in a simplified manner, and it would be clear to one skilled in the art that an actual implementation would be integrated with a larger software routine or application.

Thus, the retrieval routine determines whether a request has been made to fetch a data value from a tamper-resistant memory storage unit at step 20. If not, regular processing is performed at step 22. If the request is identified as a request to retrieve a data value from a virtual memory, then control passes to step 24. At step 24, the routine determines a mapping of a virtual address onto an actual data address complementary to that calculated at step 14 above, and at step 26, the data value can then be accessed in its actual memory location. This mapping would be done in a manner complementary to that performed during the storage routine, i.e. using a pseudo-random function such as a hash function.

In a complementary manner to the storage routine above, the retrieval routine may be integrated into an existing system as a new layer lying between a software application and an operating system. Thus, a request from a software routine to retrieve the value of a variable will be mapped onto a virtual address which is provided to the routine in FIG. 2, to be hashed.

The method of the invention provides many benefits. By saving data in a dispersed manner through the available memory space, it is impossible for an attacker to obtain anything meaningful from analysing the stored memory. In the prior art, data is stored in successive or adjacent memory locations, but in the case of the invention, the memory-wise spacial relationship has been removed, and the data is now dispersed in a pseudo-random manner.

As noted above, this dispersion makes it difficult for an attacker to locate certain pieces of data he is searching for, but also distributes the data values with respect to one another. Thus, data are not stored in areas of the memory one might expect them to be, and there are no clearly identifiable blocks or patterns of data in the memory.

For example, one avenue of attacking an encrypted memory is to search for repetitious patterns. In a text document which is encrypted with a single key, a given word will appear as the same encrypted data, each time it occurs in the original document. Thus, the attacker can identify a block of encrypted code which appears to be repeated often in the memory and assume that it corresponds to a commonly used word. The attacker would start with the statistically most common words, calculating a corresponding key, and determining whether the rest of the encoding makes sense in terms of that key. In English, candidates for a short encoding might include, for example: "the", "is", or "if".

However, in the method of the invention, each of the letters in these short words could be stored in dispersed locations in the memory. Thus, when the word "the" is stored, the codes corresponding to these three letters will not appear together, but be randomly dispersed throughout the memory. There is therefore no repetition of a code pattern in the mass data storage, for an attacker to exploit.

The implementation of the invention makes the use of passwords and other keys far more practical and secure. Because they are stored electronically, passwords can be complex enough to be immune to dictionary or "guessing" attacks, and will not be lost or forgotten like passwords which rely on the user's memory. Unlike stored passwords known in the art, passwords protected using the invention can be stored on a user's computer without the fear of discovery, tampering or theft, because the password data is not stored as a single block in the memory, but is distributed throughout the memory.

The invention does not rely on any physical protection such as a firewall, but assumes that the attacker will ultimately be able to access the data, and secures it by making it incomprehensible to the attacker. Because the data itself is protected, the invention does not suffer from the shortcomings of known physical protection techniques, which, once cracked, allow the attacker access to all of the protected data (i.e. when a firewall as been breached, or an encryption key or password has been discovered).

Biometric passwords may also be used much more securely with the invention. In the past, accessing a local area network (LAN) in an office environment with a biometric password, would require that a server on the LAN store a copy of the biometric password for comparison. This made the server a high value target for attack. However, storing the biometric reference data in the distributed manner of the invention, it is now secure.

Finally, because the invention may be implemented as a new software layer in an existing system, it can be applied to the existing infrastructure of computers, PDAs, cellular telephones and other electronic devices without changing their architectures.

The preferred embodiment of the invention described hereinafter, presents many additional techniques which complement the main invention. These additional techniques may be applied collectively, or independently to obtain varying degrees of security. For example:

1. using different hashes for different data addresses, making it more difficult for the attacker to correlate different codings;
2. varying the hashes and encryption keys while the target program is running, so that an attacker obtains no benefit from decoding only a part of the routine, at some point in time;
3. encrypting the data being stored;

4. concealing the hash function by cloaking the entire routine using data flow and control flow encoding as described hereinafter. Data flow encoding is described in detail in the co-pending patent application titled "Tamper Resistant Software Encoding", filed as U.S. patent application Ser. No. 09/329,117, and control flow encoding is described in detail in the co-pending patent application titled "Tamper Resistant Software—Control Flow Encoding", filed as U.S. patent application Ser. No. 09/377,312; and 5. using data flow encoding of the address and data before even beginning the routine of the invention. In this way, the data and addresses are encoded at all times and unprotected data is never exposed.

DETAILED DESCRIPTION OF EMBODIMENTS OF THE INVENTION

1.0 General Concepts

As noted above, the effect of applying the invention is to modify the mass data which is part of a program so that the mass data is converted into an obscure, tamper-resistant form. This results in some data expansion for the mass data, some code expansion and slower execution for the code accessing the mass data.

In addition to its effect on mass data stored within the program proper, any affected files are likewise increased in bulk, and the code accessing those files is increased in bulk and made slower. In addition, all access to such files becomes block-oriented; that is, communication with such files employs reads and writes of fixed-size blocks of data. These minor compromises to program efficiency are easily compensated by the added security the invention provides.

The basic building-block of the mass data encoding invention is the (compile-time) software virtual memory array (SVMA) and the implementation of its associated (run-time) software actual memory array (SAMA).

Conceptually, an SVMA is a linear array of raw memory cells, all of equal size. Typically, SVMA addresses for an SVMA with n cells range from 0 to n−1 inclusive.

A raw memory cell is an area of memory of fixed size: a certain fixed number of bits, such as 32 bits, 64 bits or 128 bits, or perhaps even 36 bits or 72 bits, depending on what size is convenient for the desired platforms on which encoded programs are to run. Pieces of data within such memory cells are stored as raw bit strings: any type information is determined by the way in which the bit strings are manipulated.

Hence, the concept of an SVMA may be compared with the view of storage taken by systems programming languages such as C™, C++™, Modula-2™, or Mesa™. In such programming languages, scalar variables and aggregate variables have types, but the types are associated with the names of the variables, not with the memory they occupy. Moreover, means are provided in such languages to access memory so that a given location or group of locations in memory can be accessed according to any desired type: not necessarily the type used on the previous accesses to the location or group of locations. Hence, memory is typeless: only named entities have types. It is this underlying typeless view of memory which SVMAs are intended to implement.

The reasons for choosing this typeless view of memory are as follows:

1. the approach is flexible in that other kinds of memory can be implemented by programming on top of such memories. For example, a typed object-oriented view of memory, typical of programming languages such as Simula-67™, Beta™, or Eiffel™, can be implemented on top of such a typeless memory (and indeed, usually must be, since computer hardware typically provides only typeless memory);

2. certain addressing techniques used in the method of the invention mandate type-independent cells of fixed size; and 3. certain addressing techniques used in the method of the invention require that pointers and integer values of a certain size be interchangeable at need. For this to work correctly, memory cells must generally be of a known fixed size.

1.1 Analogy to Hardware

In computing science, the concept of a hardware virtual memory array is familiar. In such a virtual memory, accesses to memory are made using virtual addresses. A virtual address is an integer value signifying a location within a hardware virtual memory array (an HVMA, which is normally just called "virtual memory"). In many cases, there is only one such array, or only two: one for data and one for code. In other cases (for example, in programs run under the Multics™ hardware-supported operating system), there are multiple HVMAs, called segments, where no fixed address distance between words in different segments exists.

Typically, the implementation of an HVMA is as follows: the hardware, in concert with the operating system software, maintain data structures which map virtual addresses to physical ones. The computer itself has a large single hardware actual memory array (HAMA): namely, the memory of the computer. Physical addresses are addresses within this HAMA.

When an address is used to read or write data, to update data in place, or to read an instruction, the address is automatically translated by hardware from an address in whichever HVMA is relevant, to an address in the appropriate HAMA. The actual read, write, or update access is then made to this location within the HAMA. Hence, the HVMA is programmer-visible, but the HAMA is not.

The relationship between SVMA and SAMA is similar, but instead of conversion from HVMA to HAMA access by memory mapping hardware at the last possible moment, the conversion from SVMA to SAMA access is performed in advance via additional code inserted by the encoding compiler after the software has been written by the programmer, but before it is actually executed.

The implementation of an SVMA by an SAMA may be compared with the implementation of an HVMA by an HAMA. An executing program encoded according to the instant invention makes virtual accesses to locations within an SVMA using a virtual address. These virtual accesses are converted by the compiler into accesses to actual locations within an SAMA by the compiler. In the preferred embodiment, this virtual address has the following characteristics:

1. the address is encoded using a scalar data encoding technique (which is a form of data flow encoding), using a control flow encoding technique, or both (since the data flow encoding may well be applied to the control flow encoding of code locations). Suitable data and control flow encoding techniques are described hereinafter; and 2. even if the above encoding or encodings were reversed to reveal the underlying unencoded scalar data or code addresses, there remains a mapping from that virtual address to an address in an SVMA, to an address within an SAMA.

Though the hardware example helps in describing how the invention works it is fundamentally different in several respects:

1. the mapping between the virtual address and the actual address is clear and traceable in the hardware implementation. While in the preferred embodiment of the invention the SVMA to SAMA mapping is far more complex, and deliberately obscured; and
2. the purpose of the hardware implementation is to make the accessible memory appear to be larger, and there is no effort to obscure the contents, arrangements or location of the data.

For example, it is common in hardware systems to divide the memory into "virtual pages", which are indexed by hashing the first few bits in a virtual address. As a result, a large group of adjacent data bytes will be stored in the same arrangement as a block in the "virtual page". In contrast, the method of the invention will compute a hash of each address so that each data value will be stored independently of the others.

1.2 Software Actual Memory Arrays (SAMAs)

The implementation of the instant invention is by means of encoding accesses to mass data in the software so that accesses which, prior to encoding, would be to SVMA cells, become accesses to corresponding software actual memory array (SAMA) cells.

A SAMA corresponding to a given SVMA comprises:

1. a linear array of cells sufficient to provide an SAMA cell corresponding to any SVMA cell in use at any point in execution of the program. The SAMA cell size need not be the same size as the corresponding SVMA cell size (typically, it is larger), and unused SVMA cells need not exist in the SAMA. Which SVMA cells are actually used may vary over time, and the size of a SAMA may vary overtime in a corresponding manner, and
2. associated data structures used to implement the mapping from encoded and mapped SVMA addresses to SAMA cell numbers, and to implement the mapping from the encoded address and data values representing the virtual values of the program to the encodings used within the SAMA cells.

Typically, a SAMA includes:

1. an array of cells;
2. an array of cell encoding tags (possibly combined with the SAMA cells);
3. a vector of address mapping coefficients or an address mapping routine or both, and;
4. a number of arrays of fetch-store mapping methods, which can be stored as routine addresses, routine numbers, or mapping coefficients.

In addition, a program (the User program) using a SAMA according to the instant invention, may be associated with a background remapping process (the Scrambler process) which modifies the SAMA and addressing coefficients and/ or routines over time, so that the same SVMA cell may wander from one SAMA cell to another under the feet of the running encoded program, without compromising the execution of the running encoded User program. If such a Scrambler process is used, periods of time when the Scrambler is running are interleaved with periods of time when the encoded User program is running. The Scrambler always completes conversion of the SAMA from one consistent state to another before permitting the process(es) of the encoded User program to proceed (that is, Scrambler memory updates are atomic from the User program's point of view).

2.0 Data Movement in the Virtual View

The virtual view of data is used by the programmer writing software, and is shared with the compiler, which translates the virtual view into the actual implementation.

The virtual view of memory accesses using SVMAs is the simple information view which is to be protected from extraction of secrets or tampering by the instant invention. The actual view shows how the virtual view can be implemented to hide the secrets in the data and protect the data against tampering.

In the virtual view of the manipulation of the data in fetches and stores, only part of the information used in the actual implementation is present. In the virtual view, this information is very simple in form.

Figure 3:
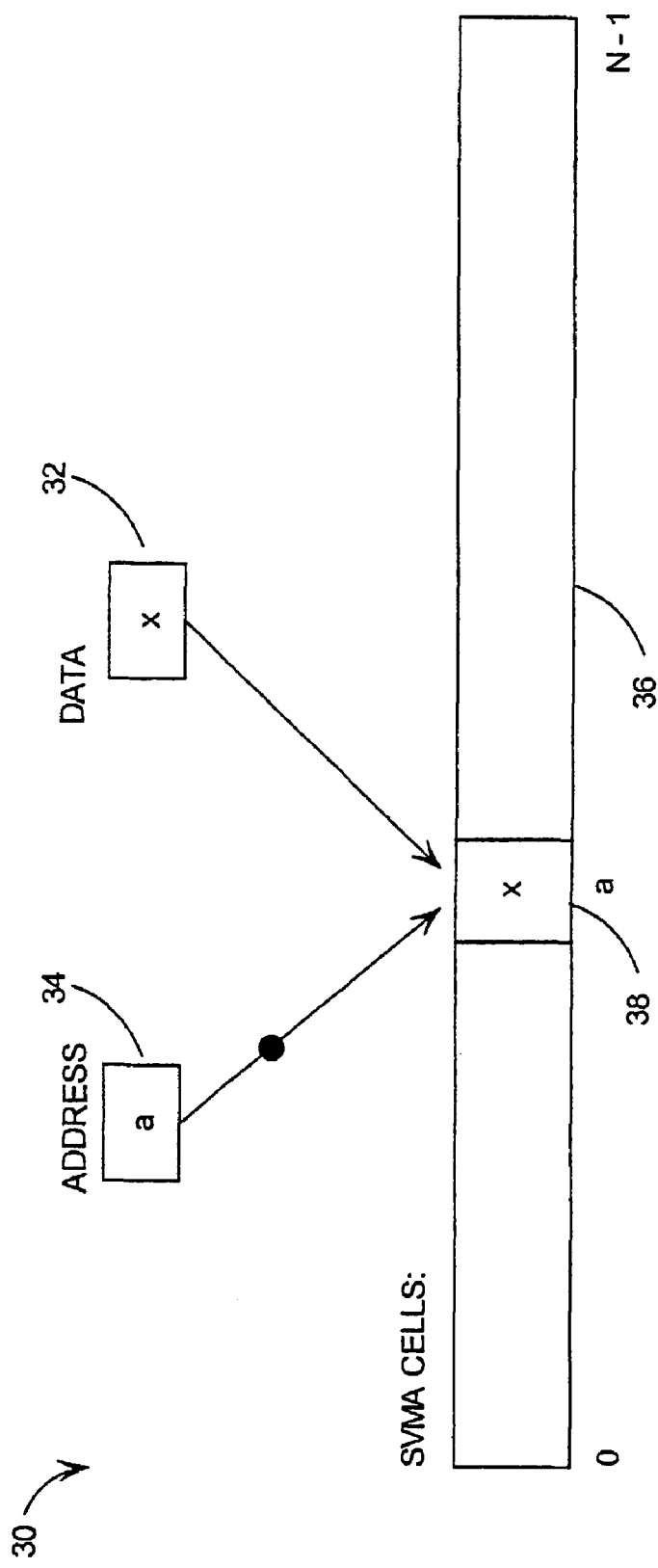
FIG. 3 presents a flow diagram of a virtual view of storing a piece of data into a cell in a software virtual memory array (SVMA) in an embodiment of the invention.

FIG. 3 presents a flow diagram of how a virtual piece of data is stored in the cell of a software virtual memory array (SVMA). Initially, a software routine or application has determined that the data value, x, is to be stored to a specific virtual address, a, and is holding the data value, x, and address, a, in local registers 32 and 34. In the virtual view, the address, a, is simply the index of a cell 38 in the SVMA 36 and the data value, x, is stored to this location. If the SVMA has N cells, then they are numbered 0 through N−1, and the address simply selects the cell numbered a.

Figure 4:
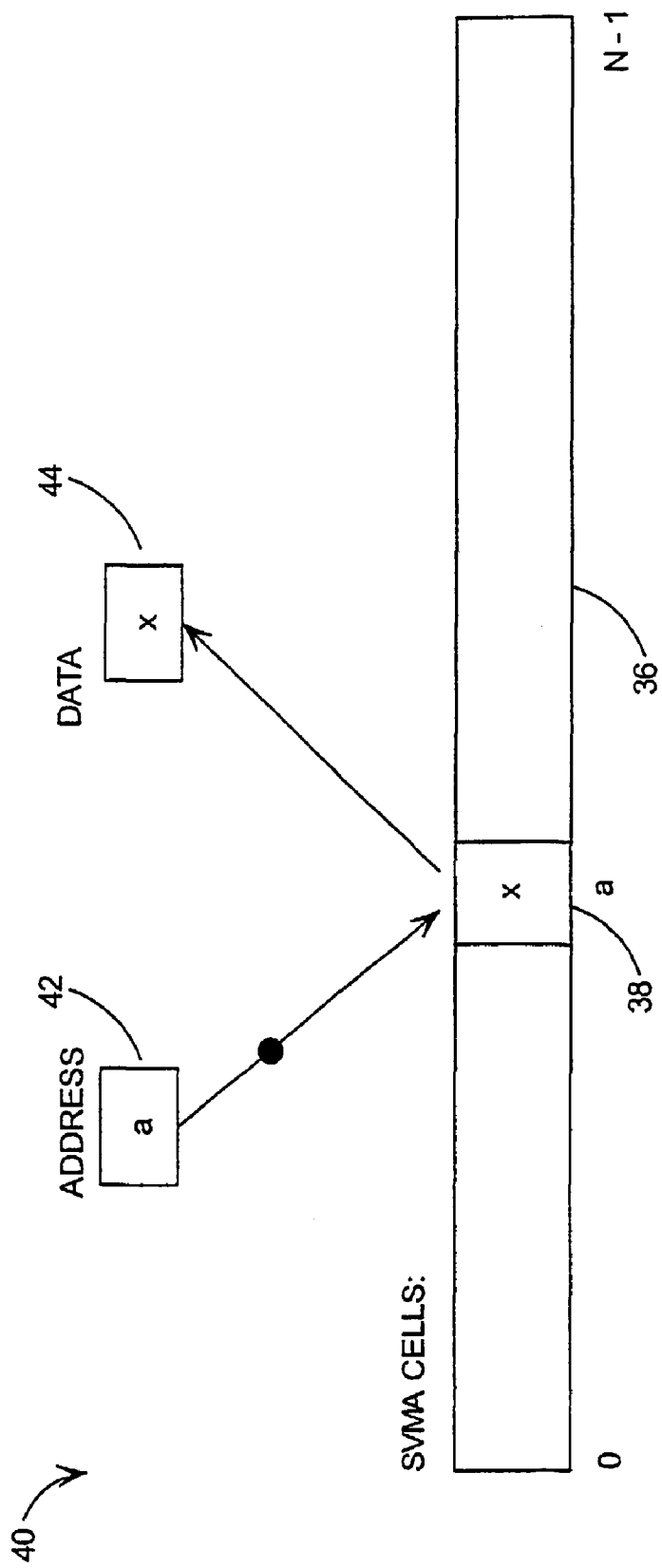
FIG. 4 presents a flow diagram of a virtual view of fetching a piece of data from a cell in a software virtual memory array (SVMA) in an embodiment of the invention.

Conversely, FIG. 4 presents the fetching of a virtual piece of data from a cell in an SVMA. In this case, a software routine or application makes a request to retrieve a data value from the address location, a, identified in the address register 42, and to place the data value in the data register 44. In the virtual view, the data value, x, is fetched from a specific virtual address, a, which is simply the index of the cell 38 in the SVMA 36.

This is very much like the situation on ordinary computer hardware for a hardware fetch or store with no memory mapping. Main memory can be viewed as a linear array of storage units corresponding to SVMA cells, and the storage units are typically numbered starting at 0.

2.1 Actual Data Storage and Movement

Figure 5:
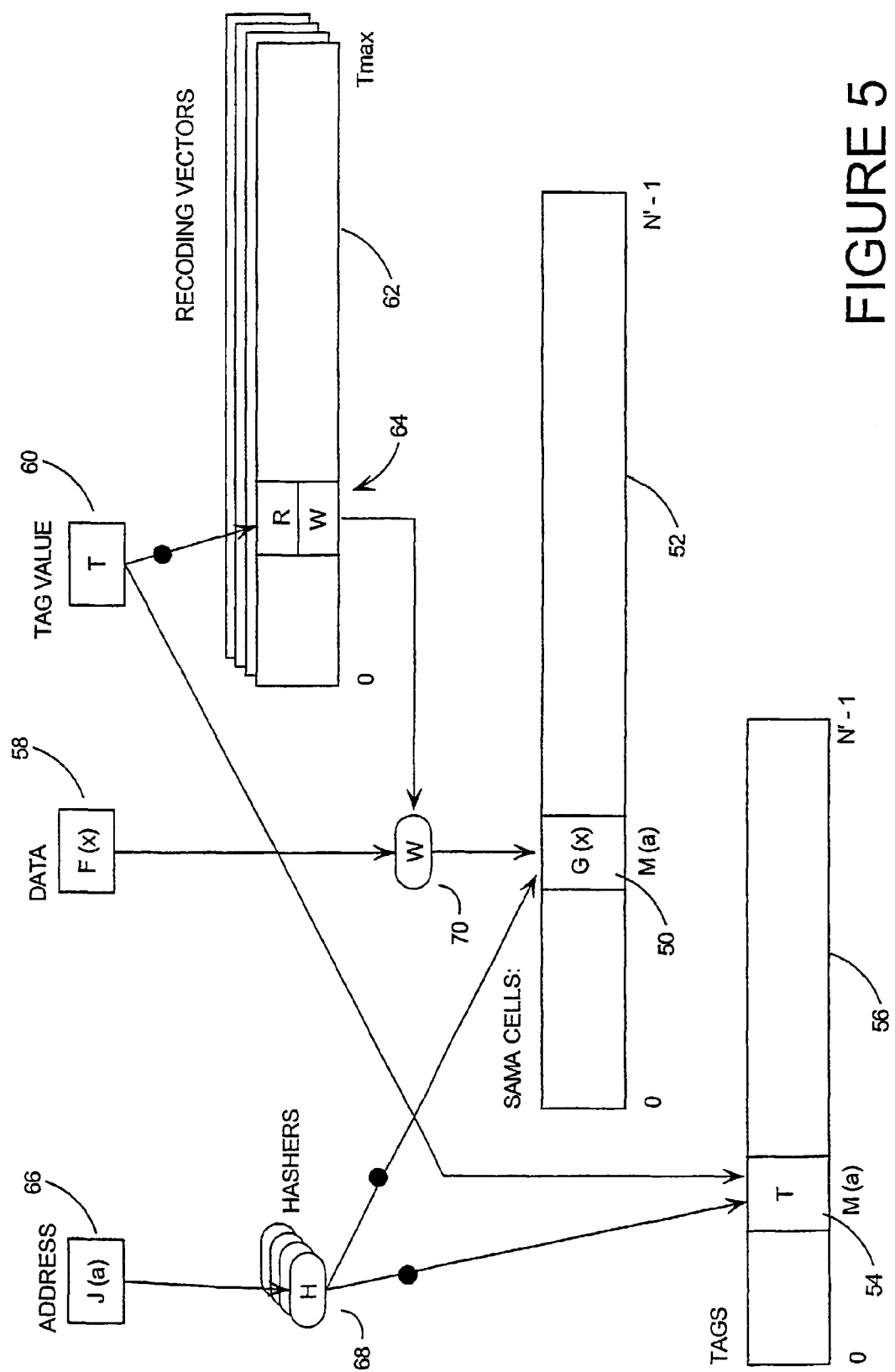
FIG. 5 presents a flow diagram of an actual view of storing a piece of data into a cell in a software actual memory array (SAMA) in an embodiment of the invention.
Figure 6:
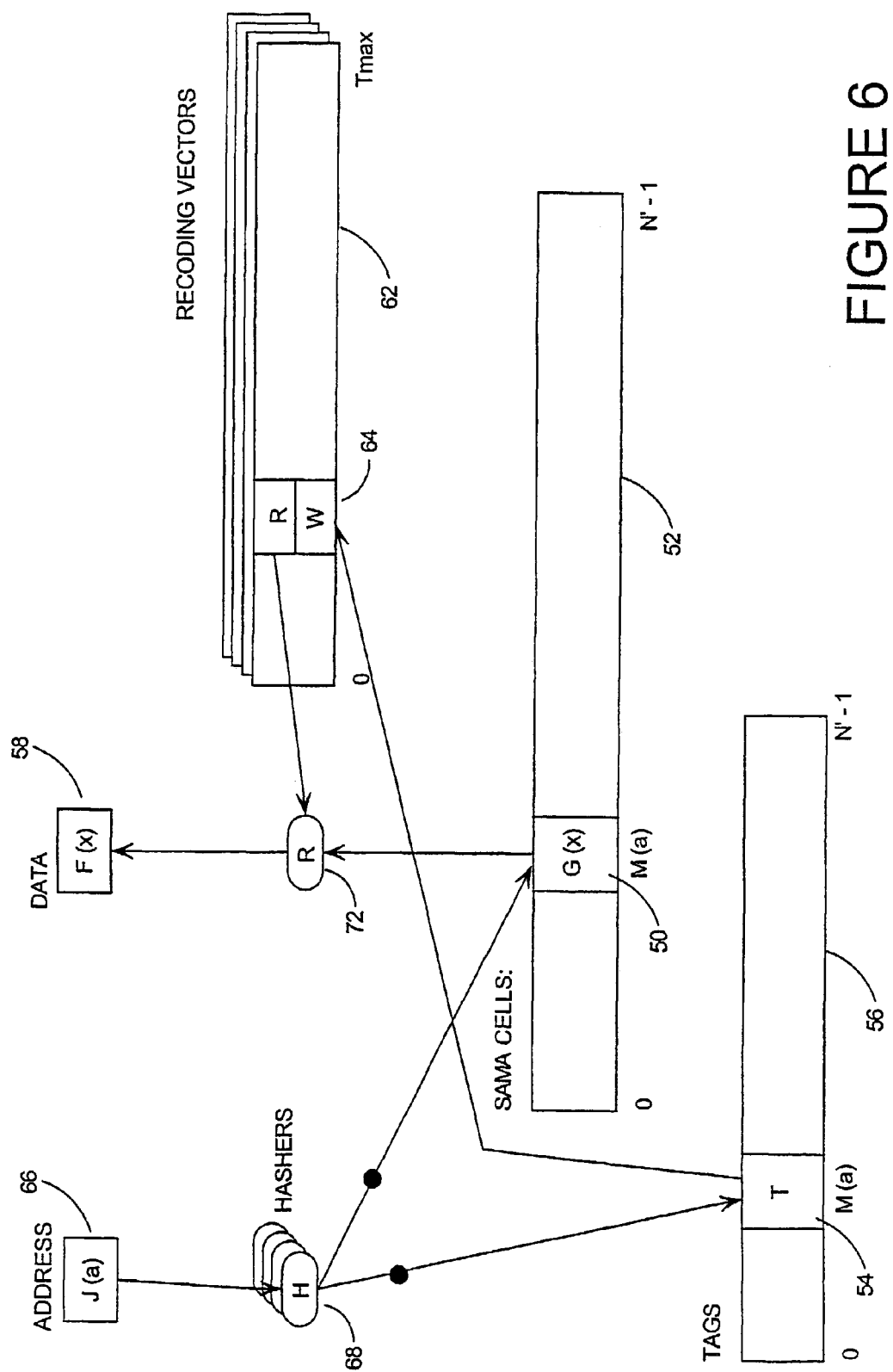
FIG. 6 presents a flow diagram of an actual view of fetching a piece of data from a cell in a software actual memory array (SAMA) in an embodiment of the invention.

While storing and fetching may appear to behave virtually as described above, the actual storing and fetching is implemented per the flow diagrams of FIGS. 5 and 6. As an overview, this embodiment of the invention encrypts or encodes the data to be stored, and stores it in a location determined by a hash of the virtual address. To prevent an attacker from obtaining information by observing the storage operation while it executes, there are a number of added layers of protection, including the following:

1. a large number of keys and hashers are used, rather than the common practice of using only one key, making it far more complicated for the attacker to decipher;
2. these keys and hashers change while the Scrambler program is running, so any information obtained by an attacker will have a very short useful life;
3. the input data and virtual addresses are themselves encoded with a data flow encoding technique, so the routine does not process real-world data that the attacker can use as a reference; and
4. all of the processing code is cloaked using tamper-resistant secret-hiding software (specifically, data and control flow encoding techniques), making the code enormously complex, resistant to reverse engineering, and fragile to tampering. In such an embodiment, the data is never handled in an unprotected form, so an attacker cannot obtain information by observing an image of code or data in the virtual memory of his system.

Because the data encodings (or their associated decodings or recodings) and the address hashes are needed to access the stored data in the form used by the computations of the program, the keys, coefficients, or routines used to perform these encodings, decodings, or recodings, and to perform these hashes, must be stored in accessible and retrievable locations. Hence, a high value target will want to protect these data with as many of the above layers of protection as possible. However, the degree to which these layers should be applied depends on the level of security needed and lower value targets may not feel it is necessary to use all of these layers.

2.1.1 Scalar Encodings

A typical view of a computer program is that the executing computer (whether virtual or actual) has a set of computational registers for manipulation of scalar operands (or an operand stack for manipulation of scalar operands, as in the Java™ virtual machine). Operations on mass data are carried out by fetching scalar elements of mass data into registers (or onto the operand stack), performing scalar operations, and storing the scalar results back into mass data.

When a scalar encoding is performed as described in the co-pending data flow encoding patent application, operands and operations are encoded as follows: consider a typical operation, Op, where Op is an ordinary computer operation such as integer addition, floating-point subtraction, integer multiplication, bitwise AND, or the like.

Op most often will have two inputs (although some operations, such as integer negation or bitwise complement, have only one), and will most often have one output. Hence, it can be represented, prior to encoding, as:

$$z = Op(x, y)$$

That is, left operand x and right operand y are provided to operation Op and the effect of Op is to return the result z. This operation, Op, could be a typical computer operation, such as addition, subtraction, multiplication, bitwise AND, or the like.

When data flow encoding is applied, x, y, and z are replaced by F(x), G(y), and H(z), respectively, where F, G, and H are the data encodings of x, y, and z, respectively. Thus, new values can be defined as:

$$x' =_{def} F(x)$$

$$y' =_{def} G(y)$$

$$z' =_{def} H(z)$$

Notationally, the above represents the encoded state of an entity by suffixing a prime-mark to the symbol for the entity.

Hence, by applying the scalar encoding technique, a computation is performed to replace Op with quite a different function, which may be called Op'. Then Op' must be such that:

$$z' = Op'(x', y')$$

Substituting the above definitions into this equation yields:

$$Op'(u, v) =_{def} H(Op(F^{-1}(u), G^{-1}(v)))$$

Of course, in creating the code for Op', the separate components of the right-hand side of the above definition are not explicitly performed. Instead, the operation is combined, so the effect of Op' is achieved without revealing the components H, Op, $F^{-1}$, and $G^{-1}$. This hides the encoding of the data and also the operation performed, because neither the plain data nor the plain operations are present in the resulting encoded program at any point. The operations and data are encoded at every point.

This data flow encoding or some encoding with a similar effect is performed on the original data, x, or the virtual address, a, before performing the core of the invention as presented in FIGS. 5 and 6. Hence, the original data, x, is identified as the data flow encoded F(x), and the virtual address, a, as the data flow encoded J(a), in FIGS. 5 and 6.

Data flow encoding techniques can be applied in connection with fetching and storing operations on mass data, where a scalar datum is fetched from mass storage into a register (or onto a stack) or stored from a register (or from a stack) into mass storage. The fact that fetch and storage operations are taking place cannot be hidden, but the scalar values being fetched and stored, the encodings thereof, and the addresses from or to which scalar values are fetched or stored, can be hidden.

Note that scalar encoding of data does not use a stored and retrievable key as in traditional encryption. Thus, there is no key an attacker can discover to easily reverse the encoding. Scalar encoding changes the domain of the variables and the functions which process those variables. Once these changes have been performed, any seed values or intermediate code used to affect the changes, can be discarded. While scalar encoded functions provide the same outputs for a given set of inputs as their original functions, their internal processing has changed completely—so much so, that an attacker cannot obtain useful information by observing their execution.

2.1.2 Preferred Embodiment of SVMA Cell Storage

The preferred embodiment of the virtual memory provided by an SVMA is as follows:

The cell contents of the SVMA, which only exists conceptually, is physically represented by the cell contents of the corresponding SAMA. For example, the SVMA cells 38 containing data value, x, in FIGS. 3 and 4 are represented by the SAMA cells 50 containing the encoded data value, G(x), in FIGS. 5 and 6, respectively.

SAMA cells are preferably physically larger than SVMA cells, since encoding the data may result in some increase in bulk. Requiring that storage for encoded data be the same size as storage for unencoded data would excessively restrict the choice of encodings.

If the programmer's unencoded software requires N cells 38 in the SVMA array 36, as shown in FIGS. 3 and 4, then it is preferred that N<N' where N' is the number of cells 50 in the SAMA array 52, as shown in FIGS. 5 and 6. That is, the SAMA array 52 is larger than the SVMA array 36, allowing the addressing scheme to use a hash function which does not map the contiguous set of integers from 0 to N−1 inclusive, onto a contiguous set of integers.

It is easy to find relatively quick hash functions which are perfect, or nearly perfect; that is, hashing an address usually produces a unique result without retries. However, it is difficult to find such hash functions that are minimal; that is, the address mapping is guaranteed to be 1-to-1. Though this leaves gaps in the actual memory, the cost of such gaps is very minor.

For each SAMA cell 50, there is a corresponding tag cell 54, storing a tag, T, which selects a particular data encoding for that SAMA cell 50. In the preferred embodiment, this is achieved by having a separate tag array 56 of N' tag cells. This separate tag array 56 is shown in FIGS. 5 and 6.

An alternative embodiment is to provide extra space in the SAMA cells 50, so that both an encoded piece of data, G(x), and its tag, T, can be stored in the SAMA cell. Which alternative is more efficient depends on details of the data encodings used and the facilities of the host platform on which code performing mass data according to the instant invention is to be run.

The purpose of having explicit tags, T, is twofold:
1. to allow the encoding of the cell contents, G(x), to be changed whenever a store to a SAMA cell 50 occurs at run-time, so that as data is used, its encoding is incrementally changed simply by execution of the encoded software, with corresponding change to its tag, T; and
2. to permit the encodings of SAMA cells 50 to be changed dynamically by a separate process while a program using the SAMA array 52, is running, without compromising the correctness of the implementation.

The running program which is using the mass data encoding is referred to herein as the User, and the process which is changing the underlying encodings the Scrambler.

At any given point in the execution of the User, there is a specific memory mapping M in effect, so that SVMA address a is mapped onto SAMA address. M(a) 50. M(a) is also the address of the corresponding tag element 54 in the tag array 56. M may change over time using another memory obscuring technique to be performed by the Scrambler, described in greater detail hereinafter. However, at any specific time in the execution of the User, there is a specific mapping, M, in effect.

The SVMA address (shown as a in FIGS. 3 and 4) is encoded by some scalar data encoding (shown as J in FIGS. 5 and 6), but the actual SAMA access must be according to the current mapping function (shown as M in FIGS. 5 and 6). The entire program which employs this embodiment of the invention is preferably encoded using a data flow encoding technique, so J varies from one fetch or store operation in the code to another. However, for any given fetch or store site, there is a fixed address encoding, J. A "site" or "code site" is a location from which access is made to a SAMA; that is, a "code site" is a site from which access is made to a SAMA. Thus, the address is a piece of data, and its data encoding function is J.

The address must therefore be converted from the current encoding J to the current SAMA address mapping M when fetching or storing. This is accomplished by means of the hashers. There is one hasher, shown as H in FIGS. 5 and 6, for each distinct address encoding J. Since M may change over time, the hashers may likewise change over time.

The function computed by the particular hasher, H, selected for a given fetch or store, is therefore defined by:

$$H(c) =_{def} M(J^{-1}(c))$$

or equivalently:

$$H =_{def} M \circ J^{-1}$$

Of course, it is preferred that the function H be computed in such a way that the components, M and $J^{-1}$, are not revealed. Thus, H does not undo J and then proceed from the unencoded state to the mapping M. Instead, it takes the encoded input straight to the mapping M without any intervening step. As a result, the function M is not revealed to an attacker.

Hence, there is no need for run-time indexing. The address of that transform, or equivalently, its data tables, is simply compiled into the code which uses it, just as the address of a particular Recoding Vector is compiled into the code at a particular Fetch or Store site. Hence, the index of an H never needs to be computed in a compiled program.

The data to be stored or fetched is also encoded by some scalar data encoding (shown as F in FIGS. 5 and 6) or some similar encrypting or encoding technique. This encoded data value F(x) stored in the input data register 58 is then encoded by some scalar data encoding (shown as G in FIGS. 5 and 6) which is selected by a corresponding tag value (shown as T in FIGS. 5 and 6) stored in the tag register 60.

Scalar values must therefore be recoded from F to G when stored and from G to F when fetched. This is accomplished by means of the recoding vectors 62 shown in FIGS. 5 and 6. There is one recoding vector 62 for each distinct register (or stack) encoding, F, and there is one R/W function pair 64 for each distinct tag value, T. Such a pair 64 is shown in each of FIGS. 5 and 6. In the preferred implementation, tags range from 0 to $T_{max}$ inclusive, where $T_{max}$ is the highest possible tag value. Hence, the length of a recoding vector 62 is $T_{max}+1$ R/W function pairs. However, an embodiment in which tags start at a negative value is also possible. (It is also possible for the length of recoding vectors 62 to vary below the above length, but this cannot increase security nor can it improve execution speed, so in the preferred embodiment, recoding vectors 62 all have the same length.)

It follows that any particular R and W functions, shown in FIGS. 5 and 6, are defined by:

$$R(e) =_{def} F(G^{-1}(e))$$

and:

$$W(e) =_{def} G(F^{-1}(e))$$

or, equivalently, by:

$$R =_{def} F \circ G^{-1}$$

and:

$$W =_{def} G \circ F^{-1}$$

Note that the tags do not reveal the encodings, because none of the functions F, G, $F^{-1}$, or $G^{-1}$, is ever revealed. Only the compositions of these functions in pairs actually appear in the program as R and W functions. A data encoding is never undone, and then encoded to a new encoding from the unencoded state; instead, encoding. is performed directly from one encoded state to another without any intervening step.

As noted above, a "code site" is a site from which access is made to a SAMA: that is, a piece of code which embodies a read from a SAMA or a write to a SAMA. To access a SAMA cell, one computes:
    computationalValue=R[codeSiteIndex, cellTag](cellContents) and to store, one computes:
    cellContents=W[codeSiteIndex, cellTag](cellContents)
where "computationalValue" is a value in its data coding, ready to be used in further encoded computations, and "cellContents" is the contents of the SAMA storage cell.

Imagine that the R/W pairs are stored in a matrix, V. Then V[v, t] is an R/W pair, where each R/W pair contains a Read transform R and a Write transform W. Then R[v, t] means the R transform of the R/W pair in V[v, t] and W[v, t] means the W transform of the R/W pair in V[v, t], where the first ("v") index is the "code site" index, and the second ("t") index is the tag of the accessed SAMA cell 50.

Now, note that an optimization is possible. There is exactly one computational value coding possible at any given code site. That is, when a fetch is made to a SAMA cell 50, a conversion is made from the tag-selected coding of the source SAMA cell 50 to the coding that was compiled into the computations which use the value being fetched.

Similarly, when storing to a SAMA cell 50, a conversion is made from the coding that was compiled, into the computations from which the value came to the tag-selected coding of the destination SAMA cell 50.

This permits the following optimization to be made: for any given code site, only one value of "v" is possible. Therefore, the matrix V can be converted into a series of vectors (the recoding vectors 62 of FIGS. 5 and 6). Instead of representing "v" as a constant integer value, indexing using "v" is effected by selecting the recording vector 62 composed of all of the elements which would have had the same "v" index if this optimization had not been done.

The "code site" index ("v" in the discussion above) is a conceptual index. It is the index which (without the above optimization) would have been used in accessing the V matrix of R/W pairs to find the R/W pair appropriate to the recoding transforms selected for code at this fetch or store site. It does not appear in the ultimate implementation. Instead, the optimization proposed above is performed to convert V into a series of Recoding Vectors indexed only by "t", the SAMA cell tag.

2.1.3 Preferred Embodiment: Store Operation

The preferred embodiment for a store operation is illustrated in FIG. 5.

Performing a particular store at an address, a, encoded in a register 66 (or on the operand stack) as encoded value J(a) for the particular store, with data x, represented by encoded value F(x) in the data register 58, is performed as follows:

1. The store selects the hasher 68, H, corresponding to the address encoding, J(a), used in this instance of the store operation. Applying H to J(a), the encoded address, yields M(a), the address a as mapped by the current address mapping, M.
2. The store procedure arbitrarily selects one of the tag values, T, as the tag selecting the encoding, say G, for the data to be stored. Selection of T is guided by some computation yielding varying T values on different executions of this particular store. Alternatively, selection of T may be hard-coded in the store procedure. This is faster and less bulky, but less secure. The store then places this tag value, T, in the tag register 60, and in cell numbered M(a) 54 in the tag array 56.
3. The store selects the particular recoding vector 62 which corresponds to the particular data encoding, F, which is always associated with this particular store. The store then obtains the W member of the R/W pair 64 indexed by the value of T in the tag register 60, in this recoding vector 62. Applying W to the encoded data, F(x) with data encoding function 70, yields the encoded data value, G(x). The store then places this encoded data value in the cell numbered M(a) 50 in the array of SAMA cells 52.

2.1.4 Preferred Embodiment: Fetch Operation

The preferred embodiment for a fetch operation is illustrated in FIG. 6.

Performing-a particular fetch at an address, a, encoded in a register 66 (or on the operand stack) as encoded value J(a) for the particular fetch, fetching some piece of data x, to be represented by an encoded value F(x), is performed as follows:

1. the fetch selects the hasher 68, H, corresponding to the address encoding, J, used in this fetch. Applying H to J(a), the encoded address, yields M(a), the address a as mapped by the current address mapping, M;
2. the fetch obtains the tag value, T, in the cell numbered M(a) 54 in the tag array 56;
3. the fetch selects the particular recoding vector 62 which corresponds to the particular register (or operand stack) data encoding, F, which is always associated with this particular fetch. The fetch then obtains the R member of the R/W pair 64 indexed by T in this recoding vector 62. Applying R to the encoded data 72, G(x), stored at location M(a) 50 in the array of SAMA cells 52, yields the encoded data value, F(x), which the fetch places in the destination register 58 (or on the operand stack).

2.2 Scrambling

As noted above, the executing program which is using the mass data encoding is referred to herein as the User, and the process which is changing the underlying encodings, the Scrambler. As long as the Scrambler ensures that a cell, its corresponding tag, and any R/W function pairs, are correspondingly changed atomically from the User's point of view, the User can continue to run correctly even though the encodings of the data in the SAMA array 52 are being changed 'under its feet'. This extends the incremental changes provided by coding changes at stores to include changes affecting many more cells at once, and to include changes affecting addressing, such as change of the hash functions which determine where a conceptual SVMA cell 38 with a particular virtual address is actually stored in the SAMA array 52.

Note that the Scrambler is not restricted to changing only tags, T, and the memory mapping function M. It may also change the contents of the recoding vectors 62 (that is, the R/W elements 64 of the recoding vectors 62, which are used when storing (W) or fetching (R) from a SAMA 52, so long as they are not changed in such a way as to invalidate the encodings used within the registers at store and fetch sites in the code, which must remain fixed. Hence, if a Scrambler process is used, there need be no fixed association between the tags and encodings: the association can vary over time during execution.

As noted above, the mapping of the SAMA cells 52 is such that to access the cell representing SVMA cell number a, one accesses SAMA cell number M(a) 50, where M is a hash function converging an unencoded cell number to the actual SAMA cell number where the data is stored. The effect of M is to scramble the cell addresses.

An address, a, will be encoded to J(a), so that in the executing code, a is never seen: the value seen during execution is J(a) instead. Then for any given J, there is a specific H such that H(J(a))=M(a).

Since J is a computational data coding which happens to encode an address, it (like any other such coding) is determined at compile-time. It cannot be modified at runtime. Hence, the various J's in a program are fixed at compile-time and do not vary over time.

However, the H transforms are some form of table-driven, run-time modifiable transforms, such as PLPBs (pointwise linear partitioned bijections are described hereinafter). As such, they can be changed at run-time by the Scrambler process. Note that, when the Scrambler is running, it must change the H tables from one consistent state to another consistent state, with corresponding changes to the positions of the cells in the affected SAMA 52. This makes it advantageous to affect only a subset of the SAMA cells at one time. PLPBs are designed to permit modification of a subset of the input values without affecting others, which allows the pauses of execution for scrambling memory to be shorter than if the entire set of all H functions for a given SAMA 52, and the positions of all of the cells in the SAMA 52, had to be changed at once.

By use of the Scrambler, a given piece of data does not have a permanent, fixed address, nor does it have a fixed encoding. Thus, any information that an attacker does obtain will no longer be relevant in a vert short period of time.

2.3 Transforms

Transforms on scalar data are used pervasively in the preferred embodiments of the invention. The way transforms are used, has previously been described. In this section, preferred embodiments for the transforms themselves are described.

2.3.1 Pervasive Use of Many Transforms

An address, a, may be encoded as J(a), and remapped by a hasher transform, H, to some new location, M(a). There are three scalar transforms on scalar address values (viewing addresses as integer values): namely, J, H, and M (see FIGS. 5 and 6). Since J may vary among different fetches and stores, and H and M may vary over time due to action of a Scrambler process, the three transforms used by a particular address at a particular time, become many transforms for multiple memory accesses over a period of time.

When a store is performed, a data value, x, may be encoded as F(x), and remapped by a write transform, W, to a new value, G(x). There are three scalar transforms on scalar operand values: namely, F, W, and G (see FIG. 5). Since F may vary from one store to another, and G varies under the control of an associated tag value, T; transforms W and G may vary over time. Moreover, the tag value, T, and the associated transform G, may be changed by a Scrambler process over time. Hence, the three transforms for a particular store at a particular time become many transforms for multiple stores over a period of time. Moreover, the association between tags and particular cell encodings may also be changed over time by a Scrambler process.

When a fetch is performed, a data value, x, may be encoded as G(x), and remapped by a read transform, R, to a new value, F(x). There are three scalar transforms on scalar operand values: namely, G, R, and F (see FIG. 6). Since G varies among SAMA cells 52, and also may vary for a given cell due to encoding changes performed by a Scrambler process, and since F varies from one fetch to another and R varies with both F and G, the three transforms for a particular fetch at a particular time become many transforms for multiple fetches over a period of time.

2.3.2 Guidelines for Composing Hashes and Address Transforms

This pervasive use of transforms requires that transforms be composable, and also that the composition of the transforms not indicate the component transforms which were merged to form the composition. Transforms which are "composable", are transforms whose data can be combined together in a meaningful way.

Plainly, for simple linear transformations of the form:

$$f(x)=ax+b$$

composition of transforms is not a problem. If it is necessary to compose the inverse of the above transform, $f^{-1}$, with another transform defined by:

$$g(x)=cx+d$$

then the desired composition $g \circ f^{-1}$ is the transform h defined by:

$$h(x)=px+q$$

where p=c/a and q=d−b/a. That is, $g \circ f^{-1}=h$.

Note that the composition does not reveal the coefficients of either f or g. Instead, it reveals only the values of expressions using those coefficents. There can be a great many different transforms f and g whose composition has the same values for the coefficients p and q. Hence, working back from the computations involved in computing h one cannot identify f and g.

However, for the composition of some address transformation, J, with some other function, to yield a nearly perfect hash (or better still, a perfect hash), the goals for J and for the address mapping, M, are quite different (As noted above, a perfect hash function is one which produces no collisions for a given set of data, that is, there are no two inputs that will cause the same output.)

For J, it is desirable to support computations on addresses, which typically involve addition and multiplication (as in locating elements of arrays by index). This suggests a linear encoding. For M, it is desirable to scatter the addresses (hash functions are sometimes called scatter functions), but without generating many collisions (or better still, no collisions at all) during hashing.

Typical hash functions are definitely not linear. So how can two functions, J, and some hasher function, H, be constructed such that their composition, M=H∘J, is a perfect hash? This problem is exacerbated by the fact that in a given encoded program, there would be multiple J's and multiple H's which would have to compose to a single M. Moreover, the compositions must be such that the components H and J are not revealed.

2.3.3 Composable Hashing Transforms

This section describes the methods which can be used for producing transforms that overcome the problems of producing hashes from the composition of a simple transform such as a linear transform with some other transform.

First, a number of concepts will be defined: a restriction of a function, a relative inverse for a function, and a relatively invertible function. These are not standard mathematical concepts, rather, they are the mathematical expression of techniques used to describe how to generate composable hashing transforms.

Let f be a function with domain U and range V. Suppose there is a proper subset, $X \subset U$, for some $X \neq \emptyset$. Let the image, f(X), of X under f, be $Y \subset V$.

The function $^X f$, obtained from f, is defined as:

$$^X f(x)=f(x), \text{ if } x \in X; \text{ otherwise}$$

$$^X f(x)=\perp(\text{that is, undefined})$$

and is referred to as the restriction of f to X.

Suppose that $^X f$ is 1-to-1, with domain X and range Y. Then $^X f$ has an inverse, $(^X f)^{-1}$. Call $(^X f)^{-1}$ the inverse of f relative to X, or simply refer to $(^X f)^{-1}$ as a relative inverse of f, meaning that it is an inverse of a restriction of f, and say that f is relatively invertible. That is, a function, f, is relatively invertible if and only if there is a non-empty subset, X, of its domain, such that, where $Y=_{def} f(X)$, $^X f$ is a bijection from X to Y. Of course, the primary interest is the case where X above is not only non-empty, but contains a sufficient set of integers to be of practical use in encoding.

A bisection is a function f from A to B, which is both "one to one" and "onto". A function f from A to B is called "1-to-1" (or one-one) if whenever f(a)=f(b) then a=b. A function. f from A to B is called "onto" if for all b in B there is an a in A such that f(a)=b.

Now suppose that f itself is 1-to-1, and f(U)=Z, but $Z \subset V$; that is, the image of U under f is properly contained in (does not cover all of) V. Given a function g with domain V such that $^Z$g is the inverse of f, then plainly, by the above definitions, f is a relative inverse of g, and g is therefore relatively invertible. (Note that a function which is invertible is always relatively invertible, but not vice versa.)

The idea here is that a function may be invertible on part of its domain, rather than all of it, or it may have an inverse over part of its range, but not all of it. Since the invention makes use of inverses in compositions, it is noteworthy that it is not necessary to use invertible functions. If the values to be transformed in practice are a subset of all the possible values, the appropriate relative inverse will work just as well as an ordinary inverse, allowing the use of functions which are only relatively invertible, so long as the relative inverse has an appropriate domain. This greatly widens the choice of transforms by making the selection criteria less constrained.

2.3.4 Pointwise Linear Partitioned Bijections (PLPBs)

A particular kind of relatively invertible function is now defined which will show how addressing transforms may be composed to achieve the objectives of the invention.

A pointwise linear partitioned bijection (PLPB) is a function, f, characterized by a 5-tuple, <D, R, M, A, B>, where:

D is a finite, nonempty subset of the integers, and is the domain of f;

R is a vector of range limits, $R_0, R_1 \ldots R_r$, where each range limit is an integer;

M is a vector of moduli, $M_0, M_1 \ldots M_{r-1}$, where each modulus is a positive integer (that is, an integer greater than zero);

A is a matrix of multipliers with r-1 rows and $M_{max}$ columns, where $M_{max}$ is the largest of $M_0, M_1 \ldots M_{r-1}$, such that each element of A is either a non-zero rational number or $\perp$ (undefined), and for any element $A_{ij}$ of A, $A_{ij} = \perp$ if and only if $j \geq M_i$; and B is a matrix of addends with r-1 rows and $M_{max}$ columns, where $M_{max}$ is the largest of $M_0, M_1 \ldots M_{r-1}$, such that each element of B is either a rational number or $\perp$ (undefined), and for any element $A_{ij}$ of B, $B_{ij} = \perp$ if and only if $j \geq M_i$;

and where the following conditions hold:

1. for any integer $x \in D$ such that $R_i \leq x < R_{i+1}$, defining $j =_{def} x \mod M_i$, then:

$$f(x) = A_{ij}x + B_{ij}$$

Hence, for each element x of its domain, the value of f(x) is determined by the particular range in which x falls (yielding the zero-origin i subscript to use in the A and B matrices) and a modulus of x in that range, using that modulus which is determined by the particular range in which x falls (yielding the zero-origin j subscript to use in the A and B matrices);

2. f(D), the image of D under f, is a finite, nonempty subset of the integers; and
3. f is a 1-to-1 function (an injection, and hence, a bijection if its range is taken as f(D)).

Definitions of the modulus operation, x mod y, differ slightly, particularly between mod functions provided in different programming languages. The definition used herein, is:

Let x be any integer, and y be any positive integer. Then: x mod $y =_{def}$ that integer, z, such that $0 \leq z < y$, and there exists an integer, k, such that z = x − ky.

As long as x and y are as stated above, such an integer z always exists, and it is always unique.

Note that:
if f is a PLPB, then so is $f^{-1}$;
if f and g are PLPBs, where the domain of f is D and the domain of g is f(D), then g∘f is also a PLPB; and
if f and g are PLPBs, where the domain of f is $D_f$ and the domain of g is $D_g$, and X and Y are defined by $Y =_{def} f(D_f) \cap D_g$ and $X =_{def} f^{-1}(Y)$ then if $Y \neq \phi$, $^Yg \circ {}^Xf$ is also a PLPB.

Moreover, if f is a simple linear injection whose domain D is a contiguous subrange of the integers, from m to n inclusive, such that f(D) is a subset of the integers, then f is a PLPB where (using the notation introduced above):

D = {i|i is an integer and $m \leq i \leq n$};

R is a vector of two elements, so that r=1, with $R_0$=m and $R_1$=n;

M is a vector of one element, with $M_0$=1;

A is a 1×1 matrix, with the single non-zero integer element $A_{00}$;

B is a 1×1 matrix, with the single integer element $B_{00}$; and $f(x) = A_{00}x + B_{00}$, for all $x \in D$.

Note also that it is easy to construct PLPBs for which D, the domain, has holes (gaps). When this occurs, the representation used on a computer could be a function similar to the mathematical PLPB, but with a larger domain (without holes), and inverses could be relative inverses in that context. That is, the mathematically focus is on strictly invertible PLPBs, but the practical implementation need only deal with relatively invertible functions based on PLPBs. As long as, in practice, values are not encountered in the 'domain gaps', this representation will behave exactly as the PLPBs on which it is based would behave.

2.3.5 Some Reasonable Hash Functions are PLPBs

Suppose a perfect hash of the integers from 0 to N inclusive is required. An exemplary perfect (but not necessarily minimal) hash of these integers is the function:

$$h(x) =_{def} (Px + Q) \mod S$$

where P and Q are integers such that:
0 < P < S;
0 < Q < S;
S > N; and
P and S are relatively prime (that is, P and S have no prime factor in common: e.g., 10=2×5 and 21=3×7 are relatively prime).

Thus, h maps each of the integers from 0 to N inclusive to a distinct integer in the range 0 to S−1 inclusive.

It is also clear that h maps a series of successive ranges of integer values onto a series of linear integer subsequences (that is, subsequences which are arithmetic progressions), and must therefore be a PLPB with appropriate choice of range (since it is a perfect hash, and therefore an injection). How long the individual linear subsequences are will depend on the ratio of P and Q. The linear subsequences could be quite long if Q were large and P were either small or close to an integral multiple of Q.

It follows that linear functions (which can be viewed as PLPBs) and hash functions (if they are PLPBs) can certainly be composed. The result of such a composition is another PLPB.

2.3.6 Choosing PLPBs for Fast Execution

An example of a PLPB which can be executed reasonably quickly, has already been presented; namely, the hash function:

$$h(x) =_{def} (Px + Q) \mod S$$

The slowest step in evaluating h is the mod operation, but it is only performed once each time h(x) is computed, and so it has only a modest effect on speed. However, PLPBs which are not in the above form can also be executed quickly.

The major factors which slow down execution of a PLPB, f, when it is implemented in a table driven form directly based on its characterization by tables (denoted by <D, R, M, A, B> above) are:

1. if the tables are large, then evaluations will be slowed by the fact that accessed table data will not fit in cache memory;
2. in the general case, selecting the appropriate containing range for x when computing f(x) using the R vector requires a binary search which iterates $\log_2$ (|R|) times;
3. in the general case, each computation of f(x) requires that one compute x mod $M_i$ for some i. Computer implementations of mod (by the remainder of a division) tend to be slow because division itself is generally slow; and
4. in the general case, each computation of f(x) requires the computation of:

$$f(x) = A_{ij}x + B_{ij}$$

where $A_{ij}$ and $B_{ij}$ are rational numbers (but it is assured that the resulting value of f(x) will be an integer).

To simplify this operation, where $A_{ij}=a/b$ $B_{ij}=c/d$, and a, b, c, d, and x are all integers, one can instead compute f(x) as the value of (adx+bc)/bd, and instead of using matrices A and B, use matrices U, V, and W, where U stores the ad values, V stores the bc values, and W stores the bd values. Then f(x) is computed as:

$$f(x) = (U_{ij}x + V_{ij})/W_{ij}$$

which reduces the computation to one multiplication, one addition, and one division. The <D, R, M, A, B> tables are then replaced by the <D, R, M, U, V, W> tables, with A and B replaced by the corresponding U, V, and W. The addition is fast on almost any computer, and the multiplication is fast on many, but the division is typically slow.

The above h function avoids these four problems by not requiring tables, avoiding caching problems, by avoiding range selection, and by avoiding division operations. Its only slow point is the use of a single mod operation.

To provide a PLPB which is rapidly computable, then, the above slow-down factors are addressed, as follows:

1. limit the table sizes such that the cache miss rate is not increased significantly;
2. either keep R short, so that $\log_2$ (|R|) is small, or arrange the values in R so that the appropriate range can be found from a contiguous set of high-order bits in the argument, x, to f(x). Then there is no searching: all that is required to find the range number for x is to shift x to the right some fixed number of positions, which is fast on almost any computer.
   A variant on the method of high-order bits as described above is to compute $y=_{def}x+k$ for some positive integer constant k, and select the range number by shifting y to the right some fixed number of bit positions to isolate a contiguous set of high-order bits. This allows the handling of cases in which some of the ranges may include negative values. This has very little impact on speed since only one extra addition is required and integer addition is fast on almost any computer;
3. choose moduli in M such that their most common values are either 1 (in which case no mod operation is required: it is known in advance that x mod 1=0), or one less than a power of two (in which case for modulus $M_i$, there is a corresponding bit-mask value, $m_i$, such that x mod $M_i$=x and $m_i$, where "and" denotes the bitwise AND operation, and where the bitwise AND operation is fast on almost any computer). The $m_i$ values would then be stored rather than the $M_i$ values; that is, the bit-masks rather than their corresponding moduli, with $m_i$=0 denoting $M_i$=1; and
4. replace A and B in the <D, R, M, A, B> tables with the corresponding U, V, and W, as above, to generate <D, R, M, U, V, W> tables. A further refinement of this, which eliminates the division operation, is to choose tables so that the elements of W are non-negative powers of two. In that case, division by $W_{ij}$ in the expression $(U_{ij}x+V_{ij})/W_{ij}$ can be replaced a right shift of $\log_2 (W_{ij})$, and instead of placing W in the tables, one can store S (the shift count matrix), where:

$$S_{ij} =_{def} \log_2(W_{ij})$$

Thus, instead of having <D, R, M, U, V, W> tables, this optimization yields <D, R, M, U, V, S> tables.

For a compiler writer skilled in the art of code generation, other optimizations should be evident from the description above.

The conclusion is that clearly the use of PLPBs can be made consistent with efficient execution.

2.3.7 Preferred Embodiment of Transforms

It is preferable to embody transforms needed for the invention as pointwise linear partitioned bijections (PLPBs) because PLPBs have the following properties:

1. they can be constructed to be composable with one another, and (in practice, for ranges of numbers actually used in programs) also with linear transforms;
2. they are suitable for data flow encoding;
3. they are relatively invertible, and therefore (in practice, for the kinds of integers encountered in programs to be encoded) do not lose information;
4. they include perfect, non-minimal hash functions, and therefore provide the kinds of address mappings needed for implementation of SVMAs by SAMAs;
5. with respect to hash functions, they are suitable for time-varying functions (since they can easily be implemented in a table-driven fashion, and incremental changes need only change selected parts of the tables), as is required for implementation of the Scrambler process;
6. they are also suitable for extendable hashing, where the domain of the hash can be extended dynamically during execution. This is important. because programs using dynamic store (such as provided by the malloc( ) function in C™) cannot predict their storage requirements, and hence, their address range requirements, in advance;
7. they can be implemented by sets of tables and a small number of utility functions to perform the transforms, given an input and a pointer to the data structure embodying the tables. Hence, in practice, they can be implemented in a small amount of code and data space; and
8. using the methods of the previous section entitled "2.3.6. Choosing PLPBs for Fast Execution", they can be constructed to provide adequate transform execution speed.

However, other forms of transforms can be used so long as they provide the needed capabilities for the implementation of SVMAs by SAMAs and for the implementation of Scrambler processes to vary address mappings and data encodings over time, and (preferably) to permit extensions of the permitted virtual address range by extendable hashing.

3.0 Tamper-Resistant, Secret-Hiding Techniques

As noted above, it is preferable that the entire User and Scrambler programs be cloaked rising tamper-resistant, secret-hiding techniques. While simple obfuscation techniques are known in the art, it is preferred that the rigorous data and control flow techniques described herein, be used.

Computer software is generally written by software developers in a high-level language which must be compiled into low-level object code in order to execute on a computer or other processor.

The low-level structure of a software program is usually described in terms of its data flow and control flow. Data flow is a description of the variables together with the operations performed on them. Control flow is a description of how control jumps from place to place in the program during execution, and the tests that are performed to determine those jumps.

The intent of tamper-resistant secret-hiding techniques is to obscure the data flow and control flow of the program to the point that it is impracticable for an attacker to obtain any meaningful information from observation of the program. As noted above, the program may process biometric data, for example, in an unprotected form. It is therefore necessary to obscure the processing of this unprotected biometric data so the attacker cannot obtain this information.

As noted above, data flow encoding is described in detail in the co-pending patent application titled"Tamper Resistant Software Encoding", filed as U.S. patent application Ser. No. 09/329,117, control flow e in the co-pending patent application titled "Tamper Resistant Software—Control Flow Encoding", filed as U.S. patent application Ser. No. 09/377,312.

The concept of data flow encoding is to transform data and data arguments from their real-world form, into a domain which does not have a corresponding high level semantic structure. For example, every value, variable and argument could be transformed from real number values in an (x, y) coordinate space, into new values in a custom (x−y, x+y) coordinate space. This would give the effect of a 45° rotation. The specific data flow encoding technique of scalar encoding is described in greater detail in section 2.1.1 above.

Figure 7:
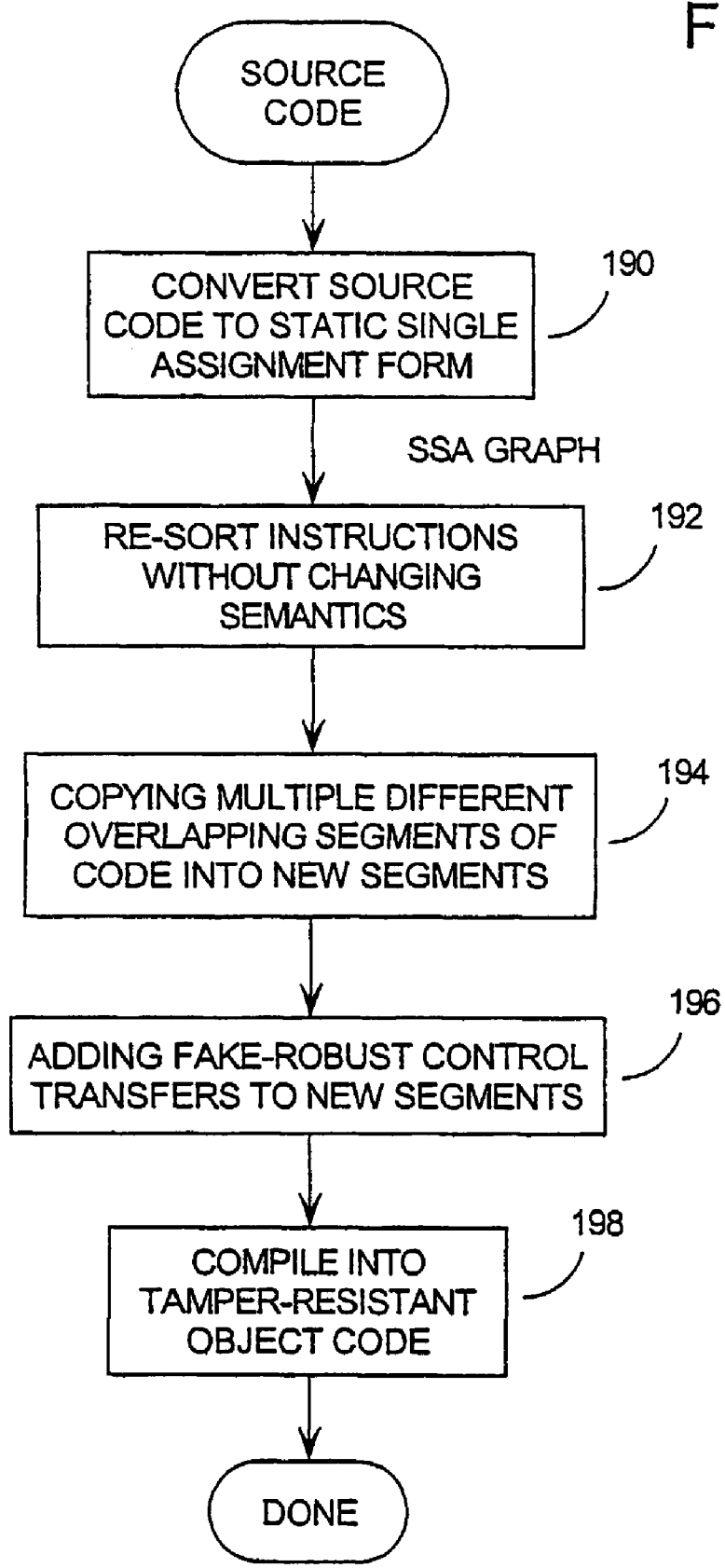
FIG. 7 presents a flow chart of a method of control flow encoding in an embodiment of the invention.

In a corresponding manner, the intent of control flow encoding is to transform the control flow into an extremely complex structure which has no succinct high level structure. The preferred method of effecting this encoding is presented in the flow chart of FIG. 7.

At step 190, source code is converted into some intermediate representation such as static single assignment (SSA) using a compiler front end.

At step 192, the intermediate form instructions are then re-sorted without changing the semantics of the program. Once the code is in an intermediate form, the interdependencies of the intermediate statements are clear and the bounds on what re-sorting could be performed may be easily determined. The understanding of these interdependencies is what allows multi-threading and optimisation techniques as known in the art.

In the case of the invention, these instructions can be re-sorted so that a direct decompiling into high level language yields obscure results. However, an enormously greater benefit is realized with the synergy between re-sorting of the code and the creation of "fake-robust" targets at step 196. In real robustness, software code can tolerate some modification without semantic change and without completely failing. Software code is fake-robust if, irrespective of what input values are used by it during execution, it does not fail or trap, though it may be performing nonsensical operations.

The strategies and limitations for re-sorting the code instructions will vary between applications, and with the type of intermediate code that is used. These restrictions would be clear to one skilled in the art.

At step 194, the re-sorted code is copied into multiple different segments. For example, in a contiguous sequence of ten successive instructions, six distinct segments of five contiguous instructions each, may be identified (namely, the pieces comprising instructions 1 to 5, 2 to 6, 3 to 7, 4 to 8, 5 to 9, or 6 to 10 of the original sequence of ten instructions). Of course, many more distinct segments may be selected from the sequence of ten instructions by choosing segments of different lengths. Some of the selections will consist of segments or sequences of segments that will correctly mirror the functionality of the original program.

At step 196, new control transfer instructions are added to make reference to the new code segments generated at step 194. These references will generally be fake-robust as they refer to the segments of the original code that were slightly modified at step 194, but will not be perfectly fake-robust unless measures are taken to ensure they will not fail. Fault-resistant programming techniques are known in the art and could be implemented as desired or required.

Finally, at step 198, the source code is compiled from the tamper-resistant intermediate code, into executable object code using a compiler back end.

Thus, the complexity of the code can be raised by orders of magnitude. These techniques can be applied to selected areas of the code that are particularly vulnerable (such as those areas processing biometric data), or uniformly across an entire program. This makes the task of reverse engineering the code to understand its operation extremely difficult, and the task of modifying it in a useful way, even more difficult.

Any modification of data in memory will, with high probability, have increasingly wide-ranging effects on execution of the program, so that modification of any piece of mass data subsequently used by the program is likely to make future execution of the program completely nonsensical after a sufficient period of time. That is, the program whose mass data is encoded according to the invention is rendered fragile to any tampering with mass data.

4.0 Protection of Inputs and Outputs

Most programs have some inputs or outputs that must be in an unencoded state, which provides an observer with a starting point from which to observe and learn the encoding function by following, step by step, the data as it goes through the system. The invention considers two methods of addressing this problem: the Maze approach. which offers moderate protection, and the White-Box Cryptography approach which offers stronger protection, but at a higher resource cost. Therefore, one might choose to apply either, depending on the circumstances.

Note that both approaches require data to be input or output in sizable chunks (preferably hundreds of bytes at a time, or more).

4.1 Maze Approach

Instead of using a single data encoding transform which goes straight from the encoded state into the unencoded one (for output) or from the unencoded state to the encoded one (for input), the "maze" approach uses a series of elaborate transforms.

For output, the encoded data is transformed into an encoding of high dimension (many variables encoded together via something like an N-dimensional linear transform) and proceeds through several intermediate transforms of equally high dimension before going to the unencoded state.

For input, the unencoded data is transformed into an encoding of high dimension (many variables encoded together via something like an N-dimensional linear transform) and proceeds through several intermediate transforms of equally high dimension before going to the normal (lower-dimension) encoded state.

This means an attacker has to do substantial work in tracing the data, which has a number of intermediate states in which entropy of one original variable is mixed across many variables of the compiled program.

4.2 White Box Cryptography

White Box Cryptography is described in the co-pending patent application titled "Obscuring Functions in Computer Software" filed in the Canadian Patent Office under Serial Number 2,327,911 on Dec. 8, 2000. This patent application describes ways in which data transforms can be performed in a cryptographically secure fashion, and ways in which such transforms might be combined with data encodings so that no clear boundary exists between the white-box cryptographic world and the data encodings used within implementations of the data flow and mass data techniques.

Like the maze approach, white box cryptography uses multiple transformations on the entrance and routines. The difference is that the transformations are much stronger, using embedded cryptography, which makes the maze much harder to penetrate.

An attacker cannot penetrate white-box cryptographic input/output mazes without a very substantial computational effort Hence, data can be output from, or input to, the data flow-encoded and mass data-encoded world, without making it possible for an attacker to follow the encodings step by step. They are just too complicated for such step-by-step following to be practically feasible.

5.0 Why is the Invention Difficult to Crack?

A given data-encoding in an embodiment of the invention consists of a methodology (such as a two-dimensional linear transform, polynomial transform or the like) and parameters which determine the particular instance of the transform. The question for the Mass Data encoding is: assuming that the attacker is within the encoded world, can he break the encodings (assuming that the input/output problem is addressed by other means)? The answer is no, because:

1. the computation which converts an unencoded value to an encoded value is never present in the code at any point. Instead, values are merely cross coded to new encodings. For example, if a linear encoding F is converted to a linear encoding G, the transformation from F to G is itself a linear transform, say P. However, there is no unique pair F and G such that:

$$G \circ F^{-1} = P$$

On the contrary, the number of possible choices for F and G given a specific P can be very large. Therefore, it would be impractical for an attacker to attempt to crack it by testing multiple guesses;

2. although SAMAs 52 employ tagged cells, and cells with the same tag (in the same SAMA 52) have the same encoding:
   a. the number of choices of encoding is large, so the entropy in the tags is insufficient to much narrow the entropy in the search space for encodings;
   b. the association between tags and encodings is arbitrary and chosen at random, so there is no meaningful pattern of tag-value associations which the attacker can use to reduce the search space; and
   c. the Scrambler process can change the associations between tags and cell encodings, so even if a particular encoding is discovered, it affects a transient value and will soon be invalid;

3. the tag associated with a cell, the location of an SVMA cell in its SAMA 52, and the association between cell tags and cell encodings, all change over time due to the actions of the Scrambler process. Moreover, the particular encodings and tags of specific cells change every time a store to the cell is made.

As a result, there is no such thing as a stable configuration of a SAMA 52. SAMAs 52 are in continuous flux, which means that any information discovered for a set of cells at one point during execution will soon be invalid. This makes it very difficult for the attacker to make any significant progress in penetrating the "meaning" of the data in a SAMA 52; and 4. the meaning of the data in a SAMA 52 exists only in connection with the program accessing the data and using the SAMA 52. Determining the meaning of the data in the SAMA 52 itself is not possible because an essential part of that meaning (the particular data encodings associated with particular load or store sites in the executable code, which constitutes one of the two cell recoding dimensions) is absent without the code.

Hence, penetrating the data concealment provided by the SAMA 52 requires penetration of both the SAMA 52 and the executable code associated with it.

6.0 Examples of Use

In general, the embodiments of the invention are useful wherever a tamper-resistant, secret-hiding program which deals with large amounts of memory, or files, or messages, is needed. For example:

1. a data-base and data-base program can be constructed using the methods of the data flow patent application together with an embodiment of the mass data invention, such that particular portions of the data are revealed only to a user who provides a validating pass phrase, or the like, to indicate the right to access; Different users can then have different access privileges, but the entire database can be given to all of the potential users without compromising the integrity of the information in the data-base;

2. two programs can communicate using blocked messages in mass data format, with a common convention on the encodings for tags. By adding some redundancy to the data (such as checksums, say), the resulting SAMA 52 can be authenticated. An attacker then cannot interfere with the communication without breaking the authentication, because the attacker does not know the encoding and so cannot fake appropriate checksums (or other authenticating information). Hence, the integrity of the communication can be guaranteed;

3. software licenses can also be enforced without requiring a license server for validation. The lines of code that test whether an access attempt should be allowed, can be protected using the invention, and cannot be altered by an attacker to allow any access to be successful; and 4. arbitrary applications can be so encoded, including those which act on sizable files. Moreover, one can translate programs written in C™, since SVMAs 36 are addressed using integers, which permits easy mapping of C pointer operations into the form required by embodiments of the mass data invention. As a result, one can encode arbitrary sizable applications written in C into secret-hiding, tamper-resistant form.

In particular, embodiments of the invention can handle the "cell libraries" of hardware design suppliers. Such suppliers are very protective of their component libraries, which represent valuable intellectual property. Nevertheless, to design with those components, simulators for the components must be supplied.

Using the invention, together with the methods of the data flow patent application, design and simulation tools can be built such that the appropriate simulations are run, but the secrets of the components are not revealed in isolation, so that the intellectual property in the component libraries is protected.

7.0 Multiple SVMAs

A single program may employ multiple SVMAs 36 with multiple underlying SAMAs 52.

In general, multiple SVMAs 36 would naturally be used whenever a program employs multiple logical address spaces, in which an integer representing a given location or entity in one of the addresses does not denote the same location or the same entity in another of the address spaces.

This situation arises in a software representation of a system such as Multics™, which naturally provides multiple address spaces. It also arises in systems written in the PL.8™ systems programming language, which increases the safety of dynamic memory accesses by providing areas, which are logically distinct address spaces.

The most common need for multiple SVMAs, however, arises in connection with the use of input/output buffers for files, streams, or pipes. In some programs, a file, stream, or pipe may be of an unknown, but potentially extremely large, length. In that case, it is impractical to provide a SAMA for the entire file and permit the file to be written in a scattered fashion under the control of a hash function. Instead, it is necessary to encode blocks of data in the file.

The buffer represents a distinct addressing region in that addresses within an input/output buffer are distinct from addresses in the ordinary data of a program. In fact, it is generally not practical, and may be quite hazardous, to store addresses of internal data in files. Moreover, any given ordinary data address N and a file or file buffer offset N necessarily denote distinct locations and entities.

To encode blocks of data in a file, an input/output buffer is defined as a fixed-size SVMA 36, which in turn is represented using a fixed-size SAMA 52. Reads from or writes to this buffer are indeed hashed and scattered, but the entire blocks are written sequentially to the file, or read sequentially from the file. Hence, the same hashing function is re-used.

Alternatively, information selecting the hashes and codings can be stored in block headers. This is not a great security risk since identifying a set of options with something like <4, 75, 23> does not provide much information about how the data is actually stored, since the attacker does not know what the 4, 75 and 23 mean.

A similar situation arises in connection with very large random-access files. Again, a SAMA 52 representing the entire file is not practical. Instead, an input/output buffer is used which is logically an SVMA 36 and implemented by a SAMA 52, and access the random-access file by means of this buffer.

In general, multiple SVMAs, say X and Y, cannot be used if an entity at address x in X and an entity at address y in Y must have any specific mathematical relationship (since multiple SVMAs simply do not provide any such relationship). SVMAs provide completely separate address spaces.

8.0 An Exemplary Implementation

Figure 8A:
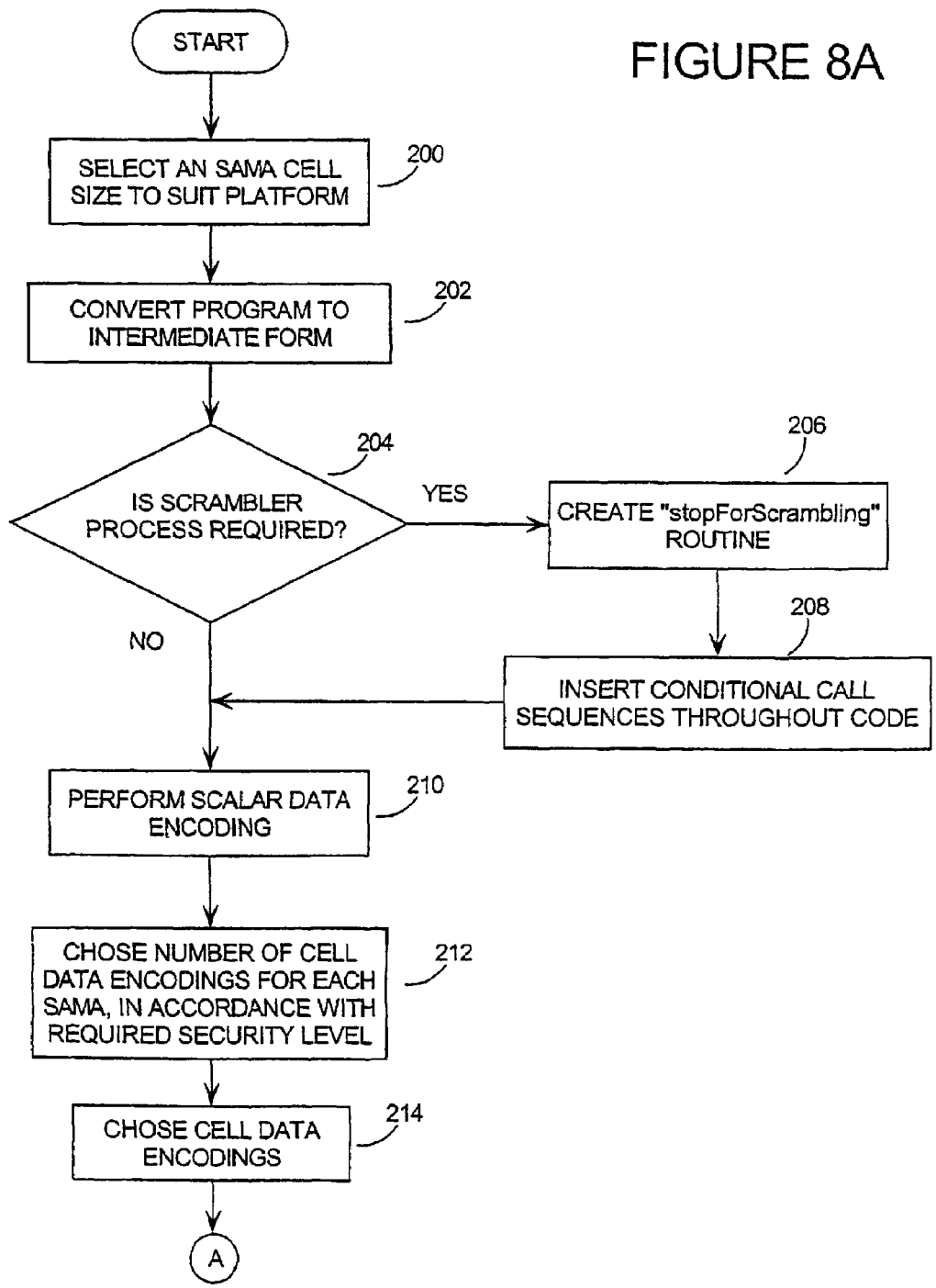
FIG. 8 presents a flow chart of an exemplary implementation of the invention.

It would be clear to one skilled in the art that the various embodiments of the invention may be applied in many ways. Generally, the logistics of particular implementations would be clear to one skilled in the art from the description of the invention herein, however, an exemplary implementation is presented in the flow chart of FIG. 8, and is described as follows:

Firstly, at step 200, the programmer selects an SAMA cell size to suit the platform on which the encoded program is to run. For example, if Mass Data protection (arrays, linked structures, etc.) is used so that fetch and store operations are performed on quantities which occupy eight bytes (typical of double-precision floating point numbers, for example), and these data are encoded into new quantities which occupy 16 bytes, then an appropriate SVMA cell 38 size is eight bytes, and an appropriate corresponding SAMA cell 50 size is 16 bytes.

Next, the program is converted into a low-level compiler intermediate form in which data flow is revealed at step 202, with an instruction level similar to the assembly level. This kind of intermediate form is typically used in optimizing compilers.

At this point, mass data in the representation or the program is represented as using SVMAs 36, which must be subsequently converted into references to SAMAs 52 in the final implementation. Each SVMA 36 is associated with exactly one SAMA 52 into which it will be converted.

A typical number of SVMAs 36 (and hence, SAMAs) is two: one for memory data (variables in stack frames, dynamically allocated data, etc.), and one for file input and output (I/O) buffering. If mass data encoded file I/O is not used, the number of SVMAs may be reduced to one. To increase the security of file I/O using mass data encoding, different SAMAs could be used for multiple file I/O buffers.

If it is determined at step 204 that a Scrambler process is to be used (which provides higher security at the cost of higher overhead), then a 'stopForScrambling' routine is generated at step 206 which suspends the running USER process (a USER process is any process which runs as part of the encoded program, other than the Scrambler process), and when all USER processes have been suspended, awakens the Scrambler process to perform a scrambling action.

Conditional call sequences of the form:

IF stopForScrambling THEN invokeScrambling( );

PENDIF; are then inserted throughout the code at step 208, so that the encoded program has a means for synchronizing with pauses during which the SAMA memory mappings, or the SAMA cell encodings, or both, will be changed. The call "invokeScrambling( )" halts execution of the encoded program and allows the Scrambler process to run so that changes in the SAMAs appear atomic to the encoded program. (If the encoded program is itself multi-process, then "invokeScrambling( )" must be called by each encoded process, so that the entire encoded program, including all of its processes other than the Scrambler process, is halted when the Scrambler modifies the SAMAs 52.)

Alternatively, some other technique which is functionally equivalent to the approach per steps 206 and 208 may be used. Alternatives should be evident to those skilled in the arts of compiler and operating system design.

Note that the Boolean flag 'stopForScrambling' is read only by the code using the SAMAs 52, and written only by the code implementing the Scrambler process (if any), so this scheme can be implemented very simply.

Next, scalar data encoding (or a similar technique) is performed on the data flow of the program at step 210. At this point, the data source for every store and the data destination for every fetch has an assigned data coding.

Here, it is assumed that a cell fetched from an SVMA 36 or stored into an SVMA 36 always has the correct encoding. When implementing the SVMA 36 by an SAMA 52, this property will have to be ensured.

Data codings should be selected so that the information stored into or fetched from an SVMA cell is encoded independently of other scalar data or data in other SVMA cells.

The number of data encodings used by the data flow encoding for fetched values or values to be stored should be limited so that their total number (which is the same as the number of recoding vectors 62 required) is not too large. Otherwise, if the number of recoding vectors 62 is allowed to grow without restriction (say, one per fetch or store), the recoding vectors 62 for a large program could take a vast amount of space in the Mass-Data-encoded implementation of a program.

Data codings should also be chosen for addresses used in fetch and store operations so that they compose with the kinds of functions used in the Hashers 68. For example, if the memory mapping function M is a PLPB and the hashers 68 are PLPBs, as in the preferred embodiment, then the data encoding of SVMA address values must be PLPBs as well (e.g., simple linear functions).

At step 212, an appropriate number of cell data encodings for each SAMA 52 must be chosen according to the required security level. This number determines the number of distinct tag values for that SAMA 52, and the length of each recoding vector 62 for that SAMA 52. As the number increases, security rises, but the amount of space needed for the recoding vectors 62 also rises. Moreover, larger numbers of encodings require wider tags: for example, if there are 256 cell encodings, a tag can be stored in a byte, but if there are more cell encodings, two bytes should be used for each tag.

At step 214, the cell data codings to be used within each SAMA 52 (one per cell tag for that SAMA 52), are chosen according to the needs of the data encodings for the data fetched from and stored to SAMAs.

Figure 8B:
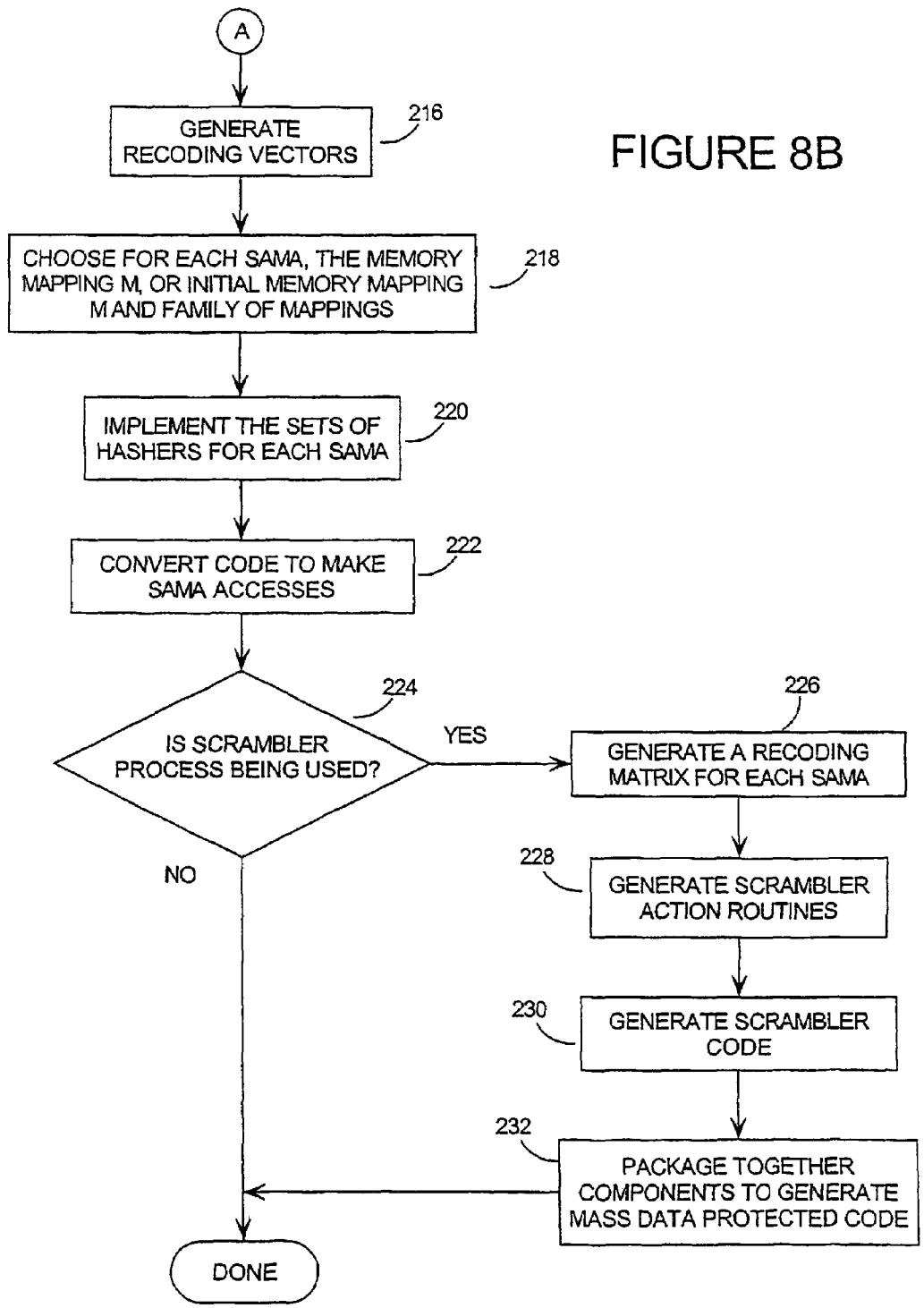

At step 216 of FIG. 8B, recoding vectors 62 are generated for each SAMA 52 according to the number of distinct tags for each SAMA 52 (that is, the length of the recoding vectors 62 for that SAMA 52) and the number of distinct data codings for encoded data to be stored into the SAMA 52 or fetched from the SAMA 52:

---

FOR each SAMA DO
    FOR each fetch/store data encoding DO
        Allocate a Recoding Vector for the fetch/store data coding.
        FOR each distinct tag of the SAMA
            Create an R (read) function which converts from the cell data
                encoding associated with that tag to the fetch/store
                encoding associated with the current Recoding Vector.
            Create a W (write) function which converts from the fetch/store
                encoding associated with the current Recoding Vector
                to the cell data coding associated with that tag.
            Place the address of the R and W functions in the R/W pair in
                the Recoding Vector at the position indicated by the
                tag.
        ENDFOR
    ENDFOR
ENDFOR

---

At step 218, according to the needs of the data encodings for the addresses used in fetches from and stores to a given SAMA 52, choose for each SAMA 52 the:

1. the memory mapping M for that SAMA 52 (if that SAMA 52 is not to be reconfigured by use of the Scrambler process); or
2. an initial memory mapping M, together with the family of memory mappings M to be employed for that SAMA 52 (if that SAMA 52 is to be reconfigured by use of the Scrambler process). Scrambling increases overhead, and increases security; no scrambling decreases overhead and reduces security.

Since, for any data encoding J used for an address, there is a hasher H 68 defined by:

$$H = M^{-1} \circ J$$

where "$\circ$" denotes the functional composition operator, this also determines the set of Hashers 68 to be used with the data encodings of the addresses (if there is no reconfiguring by the Scrambler process), or the family of sets of Hashers 68 to be used (if there is to be reconfiguring by the Scrambler process).

Part of the choice of M is to choose M, or the family of Ms, for a SAMA 52, to support any desired optimizations. That is, three forms of tables are presented to implement PLPBs: the <D, R, M, A, B> implementation of the PLPB tables is the most general and secure, the <D, R, M, U, V, W> implementation of the tables is faster, but not quite as secure, and the <D, R, M, U, V, S> implementation of the tables is the fastest and the least secure.

Next, implement the sets of Hashers 68 for each SAMA 52 at step 220. If families of Ms are generated due to the use of a Scrambler process, then the Hashers 68 should be table-driven so that modification of the Hashers 68 to suit new codings in the family of Ms for a given SAMA 52 can be done by modifying the entries in the tables, rather than by modifying executable code. The initial states of the tables would then be set according to the initial Ms. Subsequent modifications of the tables would then be made by the Scrambler process when the Ms were changed.

At step 222, then convert the code to make SAMA accesses using the above structures, including accessing memory using the appropriate Hasher 68 to convert the address encoding to the appropriate cell index in the SAMA 52 which contains the accessed cell. At this point, all encoded mass data memory fetches and stores retrieve or store information in SAMAs 52.

If it is determined at step 224 that no Scrambler process is to be used, the Mass Data encoding of the program is now complete. Otherwise, the process continues at step 226 as follows.

If a Scrambler process is to be used, generate the recoding matrix 'Recode' for each SAMA 52 at step 226. A recoding matrix is a square N×N matrix, where N is the number of distinct tags used in the SAMA 52. Each element Recode[t', t] contains a pointer to a routine. These routines are generated, where the routine whose address is at Recode[t', t] is a routine which takes data encoded with the encoding whose tag is t, and converts it to data whose tag is t'.

Next, generate the Scrambler Action Routines (SARs) at step 228. An SAR performs some scrambling action. Possible actions are:

1. randomly select a SAMA 52, and a fraction F, where 0<F<=1 (e.g. 1/10), and repeat the following until at least a proportion F of all of the cells in that SAMA 52 have been modified:
   a. select a cell at random from those not yet modified by this action. To do this efficiently, it is necessary to have a good method for visiting the cells at random but without selecting the same cell twice. One efficient way to do this is as follows:
  i. use a small, fixed size array A of K integers; and
  ii. recode an approximate proportion, F, of each sequence of K cells in the SAMA (1 ... K, K+1 ... 2K, 2K+1 ... 3K, ...) and so on to the end of the SAMA 52.

Other ways to do this should be clear to one skilled in the arts of pseudo-random number generation. For example, one skilled in computer simulation would find this straightforward; and then b. modify the value V in the cell by computing:

$$v'=\text{Recode}[t',t](V)$$

where V' is the new cell value, V is the old cell value, t' is the tag for the new cell data encoding, t is the tag for the old cell data encoding; or 2. remap a proportion F, where 0<F<=1, of the SAMA cells 52:
  a. compute a modification, M', of the memory mapping function, M, of a SAMA 52, such that out of all of the SVMA addresses, an approximate proportion F are remapped, where 0<F<=1. (In the case of PLPBs, this is a straightforward application of linear algebra.)
  b. modify the tables of the Hashers 68 for the SAMA according to the new memory mapping M'; and
  c. swap cell contents according to the remapping of cell positions from M to M'.

Next, generate the code of the Scrambler process at step 230. The body of this process cycles through a loop which includes the following steps:
1. suspend the Scrambler for a period of time determined by how often it is desired to perform a scrambling action (shorter suspensions imply more frequent actions, higher overhead, and higher security; longer suspensions imply less frequent actions, lower overhead, and lower security);
2. set the 'stopForScrambling' flag to TRUE (see step 206 above);
3. wait until all of the processes which are USERS of the SAMAs 52 (as opposed to the Scrambler) have called 'invokeScrambling', and are therefore suspended awaiting completion of a scrambling action;
4. select an SAR (see step 228 above) at random, according to the proportion of actions of each type desired for each SAMA 52;
5. call the SAR, thereby performing its scrambling action; and
6. make all of the User processes which were suspended in their calls to 'invokeScrambling' ready to run again (that is, available to the process scheduler), and await another Scrambler call.

Finally, package together the User code encoded according to the Mass Data encoding, the 'stopForScramblinkg' flag, the 'invokeScrambler' routine, the SARs (see step 228 above), and the Scrambler process code, into one program at step 232. This program is now the Mass Data encoded version of the original program.

While particular embodiments of the present invention have been shown and described, it is clear that changes and modifications may be made to such embodiments without departing from the true scope and spirit of the invention. For example, rather than using the encoding techniques described, alternate techniques could be developed which dissociate the observable execution of a program from the code causing the activity.

It is understood that as de-compiling and debugging tools become more and more powerful, the degree to which the techniques of the invention must be applied to ensure tamper protection, will also rise. As well, the need to manage system resources may also be reduced over time as the cost and speed of computer execution and memory storage capacity continue to improve, making greater code bulk less of a concern.

These improvements will also increase the attacker's ability to overcome the simpler tamper-resistance techniques included in the scope of the claims. It is understood, therefore, that the utility of some of the simpler claimed encoding techniques may correspondingly decrease over time. Similar remarks can be made about the protection provided by encryption, as advances in computing power and increased knowledge have rendered weaker forms of cryptography less useful. One skilled in the art would recognize these factors and apply the invention accordingly.

As noted above, it is also understood that computer control and software is becoming more and more common. It is also understood that software encoded in the manner of the invention is not limited to the applications described, but may be applied to any manner of the software stored, or executing.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

It would also be clear to one skilled in the art that this invention need not be limited to the described scope of computers and computer systems. Credit, debit, bank and smart cards could be encoded to apply the invention to their respective applications. An electronic commerce system in a manner of the invention could for example, be applied to point of sale terminals, vending machines, pay telephones, inventory control or rental cars and using magnetic strips or electronic circuits to store the software and passwords. Again, such implementations would be clear to one skilled in the art, and do not take away from the invention.

What is claimed is:

1. A method of writing encrypted data to a computer memory in a computer program, the method comprising:
  a) encrypting data using a first encoding to result in encoded data, said first encoding being previously selected:
  b) encrypting a memory address a using an encoding transform J to result in an encoded memory address J(a);
  c) applying a hashing transform H to said encoded memory address J(a) to result in an index M(a) where M(a)=H(J(a)), a function M(x) being a hash function and index M(a) being an index to an array of memory cells, said index M(a) referencing both a specific data cell in said array of memory cells and a specific storage cell;

d) selecting a tag value from a plurality of tag values, said tag value indicating a desired encryption encoding for said specific data cell indexed by said index M(a) determined in step c);

e) storing said tag value in said specific storage cell referenced by said index value M(a);

f) selecting a recoding vector based on said first encoding used in step a);

g) retrieving a recoding control value from an element of said recoding vector selected in step f), said element of said recoding vector being determined by indexing said recoding vector using said tag value selected in step d);

h) encrypting said encoded data using said recoding control value to result in recoded data, said recoded data being differently encrypted from said encoded data i) storing said recoded data in said specific data cell referenced by said index M(a).

2. A method according to claim 1 wherein said storage cell and said specific data cell are the same cell.

3. A method according to claim 1 wherein said recoding-control value is one of a pair of recoding-control values, said recoding-control value used in step g) being a write recoding-control value.

4. A method according to claim 1 wherein said hashing transform is selected from a plurality of table-driven, run-time modifiable transforms.

5. A method according to claim 1 wherein said tag value is different for different executions of said method.

6. A method according to claim 4 wherein said hashing transform H is changed for different executions of said method.

7. A method of reading original encrypted data from a computer memory in a computer program, the method comprising the steps of:

a) encrypting a memory address a using an encoding transform J to result in an encoded memory address J(a);

b) applying a hashing transform H to said encoded memory address J(a) to result in an index M(a) where M(a)=H(J(a)), a function M(x) being a hash function and index M(a) being an index to an array of memory cells, said index M(a) referencing both a specific data cell in said array of memory cells and a specific storage cell;

c) retrieving a tag value from said specific storage cell referenced by said index M(a);

d) selecting a recoding vector based on a previously determined first encoding, said first encoding matching a desired form of encryption for data to be retrieved;

e) retrieving a recoding control value from an element of said recoding vector selected in step d), said element of said recoding vector being determined by indexing said recoding vector using said tag value retrieved in step c);

f) retrieving stored encrypted data from said specific data cell referenced by said index M(a);

g) recoding said stored encrypted data using said recoded control value to result in said encrypted data in a desired form of encryption.

8. A method according to claim 7 wherein said specific storage cell and said specific data cell are the same cell.

9. A method according to claim 7 wherein said recoding-control value is one of a pair of recoding-control values, said recoding-control value used in step e) being a read recoding-control value.

10. A method according to claim 7 wherein said hashing transform is selected from a plurality of table-driven, run-time modifiable transforms.

11. A method according to claim 4 wherein said hashing transform H is periodically changed and affected encodings are recalculated and affected stored data is moved accordingly.

12. A method according to claim 7 wherein tag values stored in said memory are periodically changed and affected encodings are recalculated and affected stored data is moved accordingly.

* * * * *